US011308054B2

(12) United States Patent
Zheng et al.

(10) Patent No.: US 11,308,054 B2
(45) Date of Patent: Apr. 19, 2022

(54) EFFICIENT LARGE COLUMN VALUES STORAGE IN COLUMNAR DATABASES

(71) Applicant: Alibaba Group Holding Limited, George Town (KY)

(72) Inventors: Fang Zheng, Sunnyvale, CA (US); Luo Congnan, Sunnyvale, CA (US); Cheng Zhu, Sunnyvale, CA (US); Ruiping Li, Sunnyvale, CA (US); Xiaowei Zhu, Sunnyvale, CA (US)

(73) Assignee: Alibaba Group Holding Limited

( * ) Notice: Subject to any disclaimer, the term of this patent is extended or adjusted under 35 U.S.C. 154(b) by 149 days.

(21) Appl. No.: 16/742,735

(22) Filed: Jan. 14, 2020

(65) Prior Publication Data
US 2021/0216515 A1 Jul. 15, 2021

(51) Int. Cl.
*G06F 16/22* (2019.01)
*G06F 16/23* (2019.01)

(52) U.S. Cl.
CPC ........ *G06F 16/221* (2019.01); *G06F 16/2282* (2019.01); *G06F 16/2379* (2019.01)

(58) Field of Classification Search
CPC ............. G06F 16/2219; G06F 16/2282; G06F 16/2365; G06F 16/221; G06F 16/2379
USPC ........................................................ 707/812
See application file for complete search history.

(56) References Cited

U.S. PATENT DOCUMENTS

| 6,061,678 A | 5/2000 | Klein | |
| 6,738,790 B1 | 5/2004 | Klein | |
| 7,437,346 B2 | 10/2008 | Ashwin | |
| 2002/0095421 A1* | 7/2002 | Koskas | G06F 16/284 |
| 2002/0138497 A1* | 9/2002 | Chen | G06F 16/24565 |
| 2008/0059492 A1* | 3/2008 | Tarin | G06F 16/221 |
| 2010/0088309 A1* | 4/2010 | Petculescu | G06F 16/221 |
| | | | 707/714 |
| 2013/0006940 A1* | 1/2013 | Garza | G06F 16/284 |
| | | | 707/648 |

OTHER PUBLICATIONS

Abadi et al., The Design and Implementation of Modern Column-Oriented Database Systems, Foundations and Trends in Databases, 2012, pp. 197-280, vol. 5, No. 3.
Author Unknown, Character Types, 2019.
Author Unknown, Greenplum Database, GitHub, Sep. 26, 2019.
Author Unknown, Greenplum, Wikipedia, Sep. 21, 2019.
Author Unknown, Long Data Types, Vertica Analytics Platform Version 9.2.x Documentation, Oct. 8, 2019.
Author Unknown, String & Binary Data Types, Snowflake Documentation, Oct. 8, 2019.
Author Unknown, TOAST, PostgreSQL 9.5.19 Documentation, Sep. 26, 2019.

* cited by examiner

*Primary Examiner* — Hung T Vy
(74) *Attorney, Agent, or Firm* — Van Pelt, Yi & James LLP

(57) ABSTRACT

Efficient large column values storage in columnar databases is disclosed, including: providing a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and operating the database using the write storage, the read storage, and the auxiliary storage.

24 Claims, 17 Drawing Sheets

| ObjectID | ChunkIndex | ChunkData |
|---|---|---|
| 0 | 0 | 0100101010110100101010101 |
| 0 | 1 | 0010001010000110111010101010 |
| 0 | 2 | 0100101000000010010111010 |
| 0 | 3 | 0100100101011000100101010001 |
| 1 | 0 | 1101001010100000000000001 |
| 1 | 1 | 1111101010001001010101010 |
| 1 | 2 | 0101001010010101001000011 |
| 1 | 3 | 0101010011101110010101001010 |
| ... | ... | ... |

200 → 202 (ObjectID 0 rows), 204 (ObjectID 1 rows)

EFFICIENT LARGE COLUMN VALUES STORAGE IN COLUMNAR DATABASES

BACKGROUND OF THE DISCLOSURE

Databases commonly support column values that are large in size. For example, according to the SQL standard, a column value of the BLOB (Binary Large Object) data type can be up to 2 GB and a column value of the VARCHAR data type can be up to 1 GB. Such large column values are pervasive in applications that store large strings, texts, images, and other types of binary data in a database. Therefore, efficient support for large column values is important for databases.

There are challenges in supporting large column values in columnar database storage. In some conventional columnar databases, multiple column values corresponding to different rows are compressed and stored together (as a "row group"). However, the presence of large column values makes the database system vulnerable to memory bloat during writing and reading a group of multiple column values. A first, simple solution to limit the buffer memory usage during writing and reading a group of column values is the database can pose a limit on the number of rows in a row group. Such an approach, although straightforward to implement, falls short when there are many large column values. In this case, the resulting row group may only contain a very small number of rows (e.g., one single row) and hence, the benefit of columnar storage over row-oriented storage is significantly reduced. A second solution to accommodate the storage of large column values is to limit the size of column values that can be stored at the database. For example, some conventional databases support column values only to 16 MB, 32 MB, or 64 MB in size. However, limiting the size of column values that can be stored at a database can be unduly restrictive and may fail to meet the user's storage needs.

BRIEF DESCRIPTION OF THE DRAWINGS

Various embodiments of the disclosure are disclosed in the following detailed description and the accompanying drawings.

FIG. 2 is an example auxiliary large column value table.

DETAILED DESCRIPTION

The disclosure can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Embodiments of efficient large column values storage in columnar databases are described herein. A database comprising a write storage, a read storage, and an auxiliary storage is provided. The write storage is used to store recent data. In some embodiments, the write storage is row-oriented. The read storage is used to store non-recent data. In some embodiments, the read storage is column-oriented. The auxiliary storage is used to store large column values in rows that could be in either or both of the write storage and the read storage. The database is operated using the write storage, the read storage, and the auxiliary storage.

Figure 1:
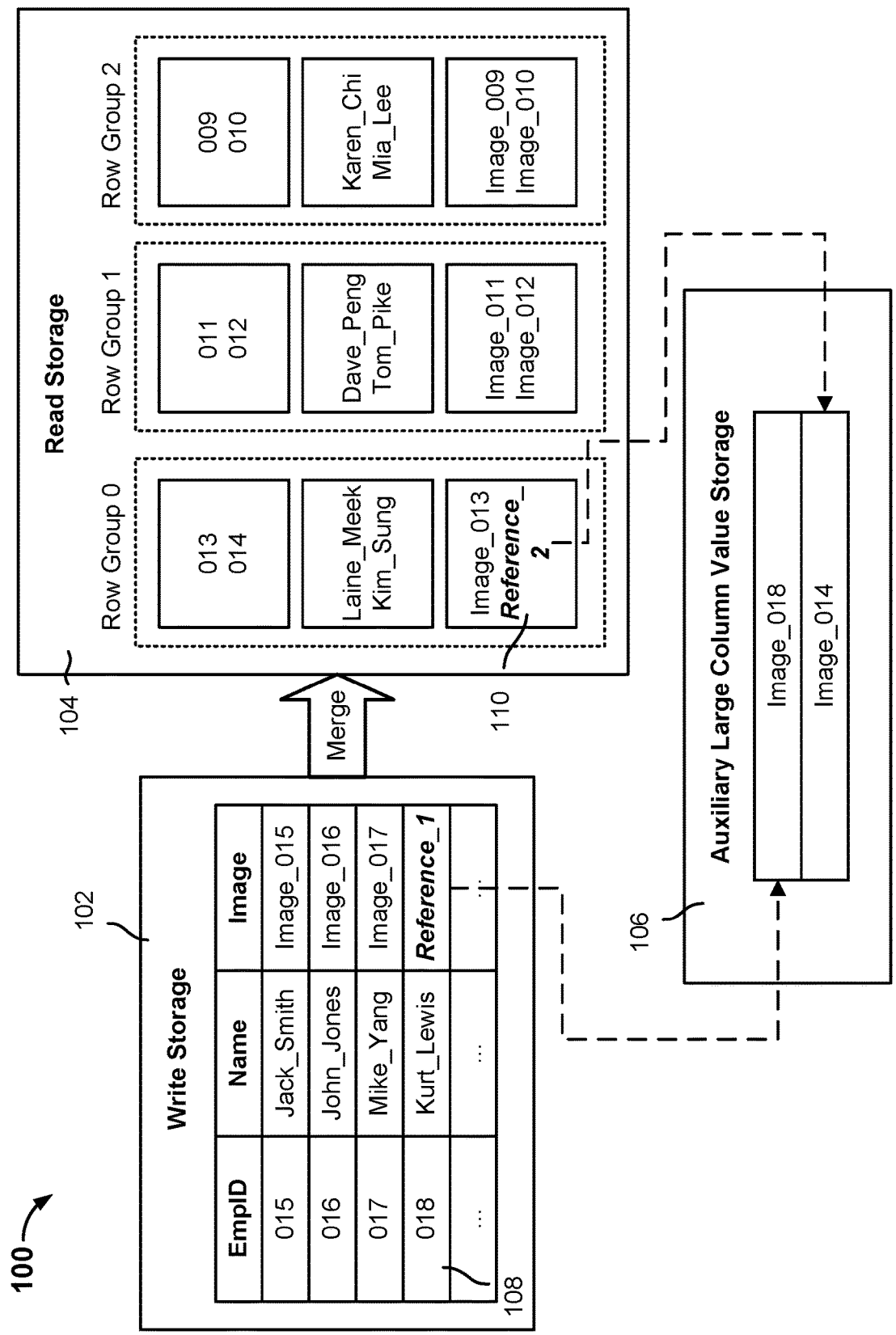
FIG. 1 is a diagram showing an embodiment of a columnar database.

FIG. 1 is a diagram showing an embodiment of a columnar database. In the example of FIG. 1, database system 100 includes write storage 102, read storage 104, and auxiliary large column value storage 106. In some embodiments, auxiliary large column value storage 106 is implemented as a table. In some embodiments, write storage 102 is referred to as a "delta storage." In some embodiments, read storage 104 is referred to as a "historical storage." Write storage 102 is configured to store data that was recently added into database 100. As will be described in further detail below, data that is stored in write storage 102 is eventually merged into the non-recent (historical) data that is stored in read storage 104. Also, as will be described in further detail below, a column value that is to be stored at either write storage 102 or read storage 104 and that meets a set of large column value criteria is stored at auxiliary large column value storage 106. In some embodiments, a large column value is stored at auxiliary large column value storage 106 after it is optionally compressed and divided into chunks. After the large column value is stored in auxiliary large column value storage 106, a set of large column value associating data (e.g., a pointer or a reference) that is usable to retrieve the large column value from auxiliary large column value storage 106 is stored in the corresponding row-column cell in whichever of write storage 102 or read storage 104 to which the large column value belonged. In some embodiments, a set of large column value associating data comprises at least data that is usable to identify the corresponding chunks in auxiliary large column value storage 106. In summary, write storage 102 stores the recent data that has been added (e.g., inserted or updated) to a database table, read storage 104 stores the non-recent data that had been added to that database table, and auxiliary large column value storage 106 stores the subset of column values belonging to portions of that database table that reside in either write storage 102 or read storage 104 that have been designated as "large." In some embodiments, database system 100 may be referred to as "columnar" because its data is (eventually) stored in a column-oriented format.

In the example of FIG. 1, write storage 102 comprises a row-oriented table. In a row-oriented table, data is stored row-by-row. All the columns of a single row are physically placed together (e.g., contiguously in physical storage). This is designed to efficiently access the data of an entire row in as few disk I/Os as possible, and is commonly used for transactional queries (e.g., Online Transactional Processing (OLTP)). In some embodiments, write storage 102 resides in memory to allow for faster accesses.

In the example of FIG. 1, read storage 104 comprises a column-oriented table. In a column-oriented table, data is stored column-by-column. The values of one column from all the rows (a "row" is also sometimes referred to as a "tuple") in a table are placed together (e.g., contiguously in physical storage). This is designed to efficiently support analytical queries which are often only interested in a subset of columns from a table, but not all. With a column-oriented storage, data of a particular column or a few columns can be retrieved without wasting I/O on the columns that are not needed. In addition, the compression on the values of a column can be more effective too because they are of the same type. This has been proven to be a huge savings on I/O cost for many typical analytical queries (e.g., Online Analytical Processing (OLAP)). In some instances, a pure column-oriented storage stores columns in separate files. Each column's file is usually further divided into blocks and each block is stored in compressed form. During query processing, data is read back from files into memory in units of blocks. However, as the values of all the columns of a single row spread across the disk in the column-oriented storage, accessing a particular row will request N disk blocks if there are N columns in the table. Unfortunately, many typical OLTP queries often request such operations.

To address this inefficiency, a variant of the column-oriented approach can be used. It is called "row group columnar storage" or "hybrid row-column storage." A hybrid row-column storage first divides tuples (i.e., rows) into groups. Then, the column-oriented storage is applied to each single group of rows. Depending on the group size, accessing a particular row will request fewer data blocks than the pure column-oriented storage, because the column values of a tuple are now located closer to each other. Thus, the row-column hybrid storage also performs well for OLTP queries, while it still gets a great deal of benefit brought by the column-oriented storage that is applied on each group. As a result, it is often a superior option for the mixing workload of both OLTP and OLAP. In various embodiments, "column-oriented storage" or "columnar storage" refers to both the pure column-oriented storage and its row-column ("row group") variant.

In some embodiments, for each column in a row group of read storage 104, a "nullness" bitmap is stored. In some embodiments, a nullness bitmap contains as many number of bits as the number of rows in the row group, and the i-th bit in the nullness bitmap indicates whether the corresponding i-th value in the column is NULL or not. In some embodiments, the nullness bitmap may be stored in a compressed form. In some embodiments, for each row group of read storage 104, a "delete" bitmap is also stored. In some embodiments, a delete bitmap contains as many number of bits as the number of rows in the group, and the i-th bit in the delete bitmap indicates whether the corresponding i-th row in the group has been deleted. Initially, a delete bitmap has all bits set to zero. In some embodiments, a delete bitmap may be stored in certain compressed form.

In some embodiments, when a row of data is added to a database table, the row of data is added to write storage 102. For example, a row to be added includes a column value (which could be a NULL or a non-NULL value) corresponding to each column of the database table. For example, adding a row to a database table is performed using INSERT or UPDATE SQL statements. In the process of adding (e.g., inserting or updating) a row, each column value of the row is compared against a set of large column value criteria associated with write storage 102. If the column value meets the set of large column value criteria, then, in various embodiments, the column value is sometimes referred to as a "large column value" and is stored at auxiliary large column value storage 106 and a set of large column value associating data (e.g., a pointer or a reference) to its location(s) is stored in auxiliary large column value storage 106 is stored in the large column value's place (e.g., row-column cell) at write storage 102. Examples of inserting a new row into write storage 102, updating an existing row in write storage 102, reading a row from write storage 102, and deleting an existing row from write storage 102 are described in detail further below.

In various embodiments, at merge events (which occur periodically or in response to user requests), at least a subset of the rows of data of a database table that is stored at write storage 102 is merged into the column-oriented read storage 104 in a merge process. For example, rows to merge from write storage 102 into read storage 104 may be selected based on a selection criteria (e.g., randomly, age, update history). As will be described in detail further below, in various embodiments, the non-large column values of selected rows from write storage 102 are copied into read storage 104 and the sets of large column value associating data of the selected rows are evaluated for whether their corresponding column values meet a set of large column value criteria associated with read storage 104. For example, write storage 102 and read storage 104 may be associated with the same or different sets of large column value criteria.

For example, sets of large column value criteria may also be configured differently depending on the database table. If a column value associated with write storage 102 that is currently stored in auxiliary large column value storage 106 meets the set of large column value criteria associated with read storage, its corresponding set of large column value associating data that is stored in write storage 102 is copied to read storage 104. Otherwise, if a column value associated with write storage 102 that is currently stored in auxiliary large column value storage 106 does not meet the set of large column value criteria associated with read storage, its corresponding set of large column value associating data that is stored in write storage 102 is used to retrieve and reconstruct the column value stored at auxiliary large column value storage 106. The reconstructed column value is then stored at read storage 104. In some embodiments, where read storage 104 stores row groups, column values belonging to groups of rows within each column are compressed and then stored together. Examples of merging data from write storage 102 to read storage 104, updating an existing row in read storage 104, deleting an existing row from read storage 104, reading a row from read storage 104, and bulk loading rows directly into read storage 104 are described in detail further below.

Turning to the specific example database entries shown in FIG. 1, write storage 102 and read storage 104 of database system 100 collectively maintain data of an example database table that stores information related to employees of a company. The database table includes columns "EmpID," "Name," and "Image." A row of information with column values corresponding to columns "EmpID," "Name," and "Image" pertains to a corresponding employee. When new rows of employee information are inserted into the employee information database table, they are added directly to write storage 102. In various embodiments, each column value of a newly inserted row is compared to a set of large column value criteria associated with write storage 102 to determine whether the column value is "large." In the event that the column value is determined to be "large," it is stored in auxiliary large column value storage 106 and a set of large column value associating data is stored in write storage 102.

For example, when row 108 is requested to be inserted into database 100, it is inserted into write storage 102. While row 108's column values for columns "EmpID" and "Name," respectively, "018" and "Kurt_Lewis," did not meet the set of large column value criteria associated with write storage 102, row 108's column value for column "Image," "Image_018," did meet the set of large column value criteria associated with write storage 102. As such, while row 108's column values "018" and "Kurt_Lewis" were stored in their respective columns in write storage 102, "Image_018" was stored in auxiliary large column value storage 106 and a set of large column value associating data, "Reference_1," was stored in "Image_018's" place in auxiliary large column value storage 106. "Reference_1" includes information that is usable to locate and retrieve "Image_018" from auxiliary large column value storage 106. For example, "Reference_1" includes an identifier (e.g., ObjectID) corresponding to "Image_018" and that identifier can be used to locate (e.g., chunks of) "Image_018" in auxiliary large column value storage 106.

Over time, the rows stored in write storage 102 are to be merged into the column-oriented storage of read storage 104. In various embodiments, merging rows from write storage 102 into read storage 104 includes converting row-oriented data into column-oriented data. In the example of FIG. 1, read storage 104 employs row groups. Specifically, as shown in FIG. 1, each example row group includes column values of two rows and where column values belonging to the same column can be compressed together into a grouped value and stored separately from column values belonging to other columns. A row group may store a set of large column value associating data that is usable to locate and retrieve a corresponding large value stored in auxiliary large column value storage 106. For example, grouped value 110, which may be compressed, stores "Image_013" as well as "Reference_2," which is usable to locate and retrieve "Image_014," which was determined to be a "large" column value based on meeting the set of large column value criteria for read storage 104, from auxiliary large column value storage 106. In various embodiments, a set of large column value associating data can be copied directly from write storage 102 to read storage 104. Given that a set of large column value associating data is a much smaller amount of data than its corresponding large column value, merging the set of large column value associating data from write storage 102 into read storage 104 is much more efficient than merging the large column value itself.

As will be described in further detail below, a large column value that is stored in auxiliary large column value storage 106 is not retrieved and reconstructed from auxiliary large column value storage 106 until it is needed (e.g., in response to a user query to read the large column value or delete the large column value), which delays/avoids the cost associated with accessing the large column value until it is appropriate. In some embodiments, a set of large column value associating data stored in either write storage 102 or read storage 104 includes a different prefix than the prefix of a non-large column value stored in either write storage 102 or read storage 104. As such, set of large column value associating data "Reference_1" in row 108 in write storage 102 has a different prefix than non-large column value "018" of the same row in write storage 102. The different prefixes between non-large column values and sets of large column value associating data can be used to easily distinguish between the different types of data that are stored in the database table.

Table 1, below, is an example schema for an auxiliary large column value table for storing large column values:

TABLE 1

| Attribute Name | Type | Description |
| --- | --- | --- |
| objectID | Integer | Unique identifier for a large column value. |
| chunkIndex | Integer | Chunk index. |
| chunkData | Binary | Chunk data payload. |

The names and types of attributes shown in Table 1 are merely examples and other names and types may be used when appropriate (e.g., the objectID may also be a string value in some implementations).

As shown in Table 1, each large column value has a unique identifier ("objectID"). As mentioned above, in some embodiments, a column value that is determined to be "large" (e.g., for meeting a set of large column value criteria) is compressed, divided into chunks, and the chunks are stored into an auxiliary large column value table. Therefore, each chunk of a compressed large column value may be identified by a corresponding chunk index ("chunkIndex"). In some embodiments, a chunk's corresponding chunkIndex indicates its order and position in the compressed value. The underlying data (data payload) of each chunk that is stored in the auxiliary large column value table can be referred to as "chunkData." In some embodiments, a set of large column value associating data (e.g., a pointer or a reference) corresponding to a large column value that is stored in the auxiliary large column value table includes at least the unique identifier ("objectID") of the large column value.

FIG. 2 is an example auxiliary large column value table. Auxiliary large column value table 200 uses the example schema that is shown in Table 1, above. Auxiliary large column value table 200 includes columns "ObjectID," "ChunkIndex," and "ChunkData." The four entries associated with set 202 include the same ObjectID of "0" and are therefore related to the same large column value. Each entry of set 202 stores the ChunkIndex and ChunkData of a corresponding chunk of the large column value associated with ObjectID "0." The four entries associated with set 204 include the same ObjectID of "1" and are therefore related to the same large column value. Each entry of set 204 stores the ChunkIndex and ChunkData of a corresponding chunk of the large column value associated with ObjectID "1." As mentioned above, a set of large column value associating data stored in a write storage or a read storage includes at least a large column value's corresponding ObjectID value, which can be used to retrieve and reconstruct the large column value from an auxiliary storage such as auxiliary large column value table 200.

Figure 3:
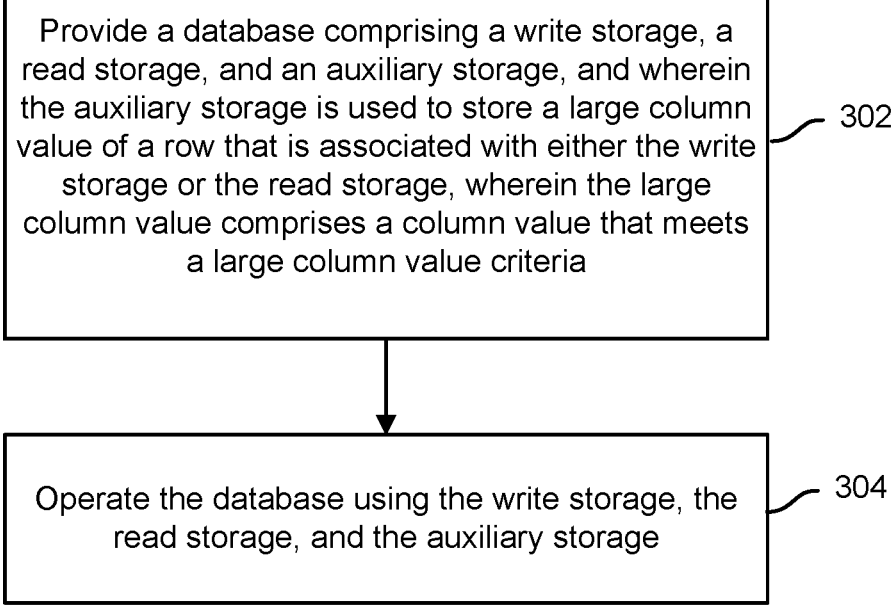
FIG. 3 is a flow diagram showing an embodiment of a process for operating a database.

FIG. 3 is a flow diagram showing an embodiment of a process for operating a database. In some embodiments, process 300 is implemented at database system 100 of FIG. 1.

At 302, a database comprising a write storage, a read storage, and an auxiliary storage is provided. The write storage is used to store recent data; the read storage is used to store non-recent data; and the auxiliary storage is used to store a large column value that is associated with either the write storage or the read storage.

At 304, the database is operated using the write storage, the read storage, and the auxiliary storage. In various embodiments, the write storage stores new data that has been inserted and/or updated to a database table. In some embodiments, the write storage is row-oriented to more quickly store dynamically received new data, which are in row-form. Column values that are to be added to the write storage are checked for whether they are "large" with respect to the write storage. A large column value is instead stored in the auxiliary storage and a set of large column value associating data that points to that large column value is stored in the write storage.

In various embodiments, rows of data are eventually merged from the write storage to the read storage. Sets of large column value associating data in the write storage are similarly merged into the read storage. In some embodiments, prior to merging a set of large column value associating data to the read storage, it is checked whether the large column value associated with the set of large column value associating data is also deemed "large" with respect to the read storage (e.g., if the column value meets a set of large column value criteria associated with the read storage). If so, the set of large column value associating data is copied from the write to the read storage, without ever needing to access the auxiliary storage. Otherwise, the corresponding column value is retrieved from the auxiliary storage using the set of large column value associating data and the reconstructed column value is stored in the read storage.

Figure 4:
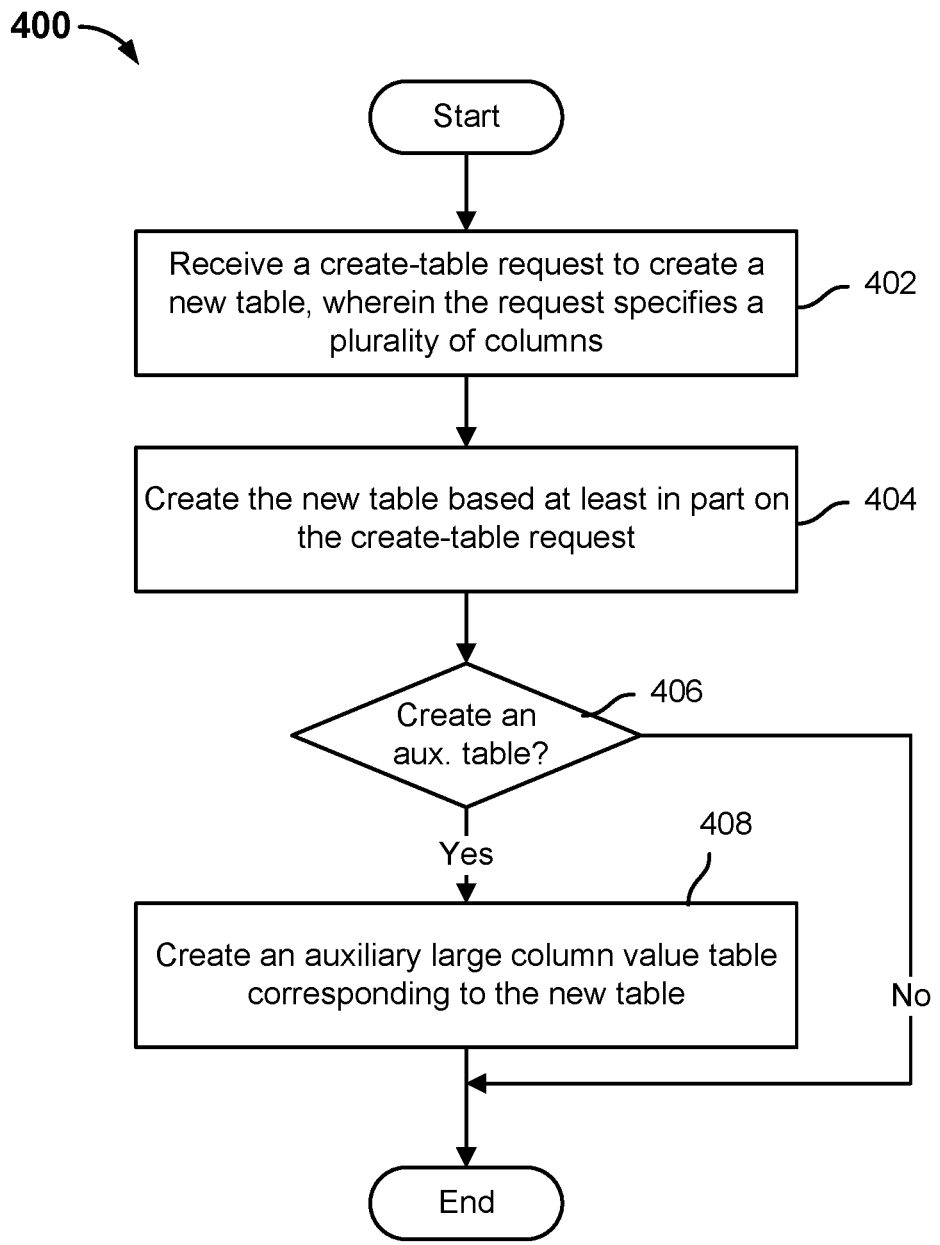
FIG. 4 is a flow diagram showing an example of a process for creating a new table in a database.

FIG. 4 is a flow diagram showing an example of a process for creating a new table in a database. In some embodiments, process 400 is implemented at database system 100 of FIG. 1. In some embodiments, step 304 of process 300 of FIG. 3 may be implemented, at least in part, using process 400.

At 402, a create-table request to create a new table is received, wherein the request specifies a plurality of columns. The request specifies at least information associated with the columns in the table. For example, information associated with the columns in the table includes, but is not limited to, the number of columns, the name of each column, and the data type of values that are to be stored in each column.

At 404, the new table is created based at least in part on the create-table request. In some embodiments, when a new table is created upon user request, information regarding its definition (including but not limited to table name, column names and data types) are recorded in the database's system catalog. The new table's write storage is created as a row-oriented table and initialized to be empty (i.e., containing no data). The new table's read storage is also allocated and initialized to be empty. The physical locations of the write and read storage of the new table are also recorded in the database system catalog as meta-data of this table.

At 406, it is determined whether an auxiliary large column value table corresponding to the new table should be created. In the event that an auxiliary large column value table should be created for the new table, control is transferred to 408. Otherwise, in the event that an auxiliary large column value table should not be created for the new table, process 400 ends. In some embodiments, whether an auxiliary large column value table should be created depends on whether the maximum size of a data type of a column in the new table exceeds a size threshold associated with creating an auxiliary large column value table. If such a threshold is exceeded, then an auxiliary large column value table should be created. But if such a threshold is not exceeded, then the auxiliary large column value table should not be created.

At 408, an auxiliary large column value table corresponding to the new table is created. The auxiliary large column value table will be used to store column values belonging to the new table and that are determined to be "large" (e.g., by meeting a set of large column value criteria). In some embodiments, the database system records that the auxiliary large column value table is created as part of the new table in its catalog (or other system metadata).

Figure 5:
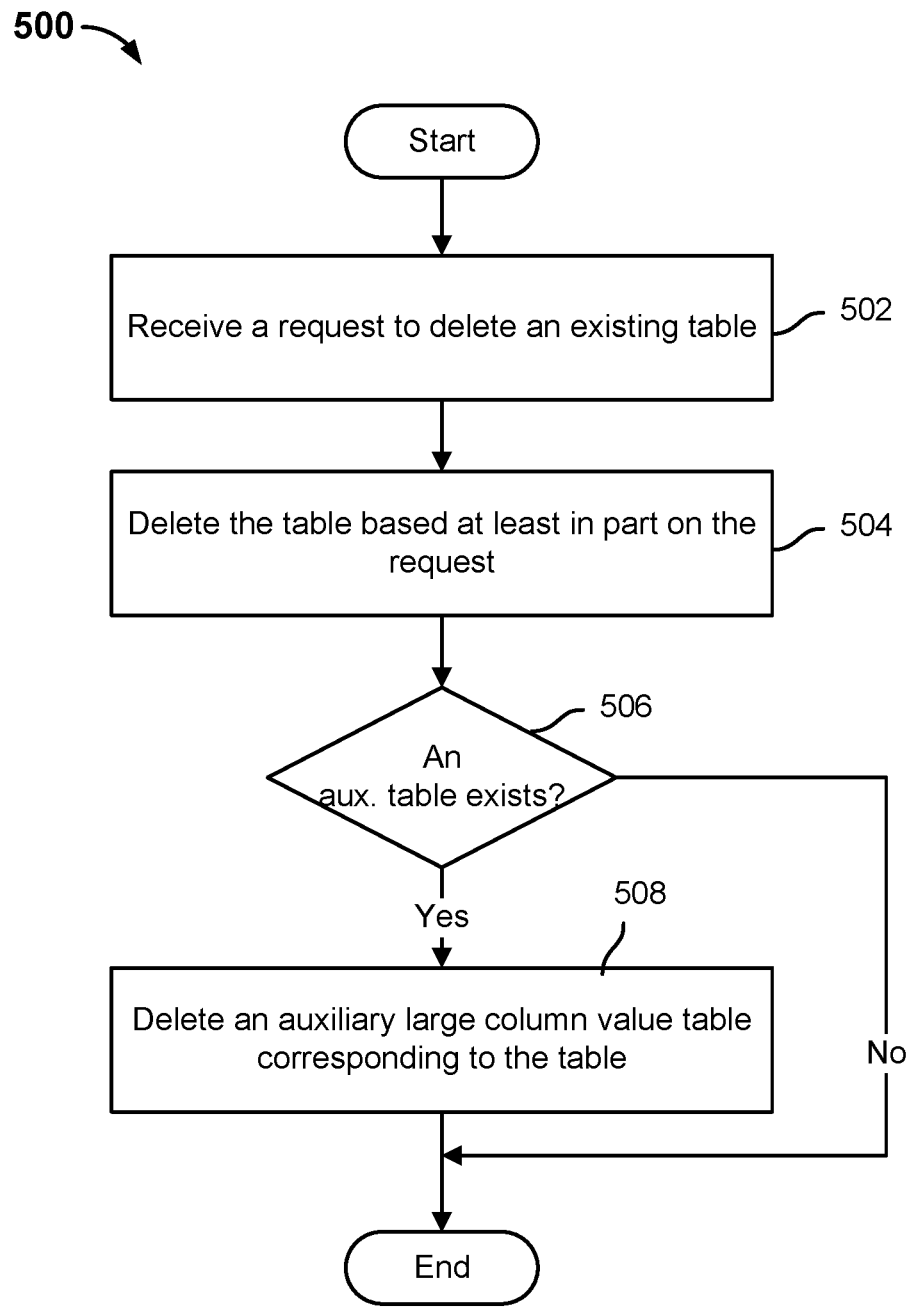
FIG. 5 is a flow diagram showing an example of a process for deleting an existing table in a database.

FIG. 5 is a flow diagram showing an example of a process for deleting an existing table in a database. In some embodiments, process 500 is implemented at database system 100 of FIG. 1. In some embodiments, step 304 of process 300 of FIG. 3 may be implemented, at least in part, using process 500.

At 502, a delete-table request to delete a table is received. A request to delete an existing (a previously created) table is received. In some embodiments, when deleting a table, the name of the table is specified in the DELETE SQL statement. The database system looks up the system catalog to locate the physical locations of the table's write storage, read storage, and auxiliary large value storage, and then performs the delete operation.

At 504, the existing table is deleted based at least in part on the delete-table request.

At 506, it is determined whether an auxiliary large column value table corresponding to the table exists. In the event that there is an auxiliary large column value table corresponding to the existing table, control is transferred to 508. Otherwise, in the event that there is not an auxiliary large column value table corresponding to the existing table, process 500 ends. For example, whether the table has a corresponding auxiliary large column value can be determined using the database catalog or other system metadata. If the table to be deleted has a corresponding auxiliary large column value table, then the auxiliary large column value is also deleted.

At 508, an auxiliary large column value table corresponding to the table is deleted.

Figure 6:
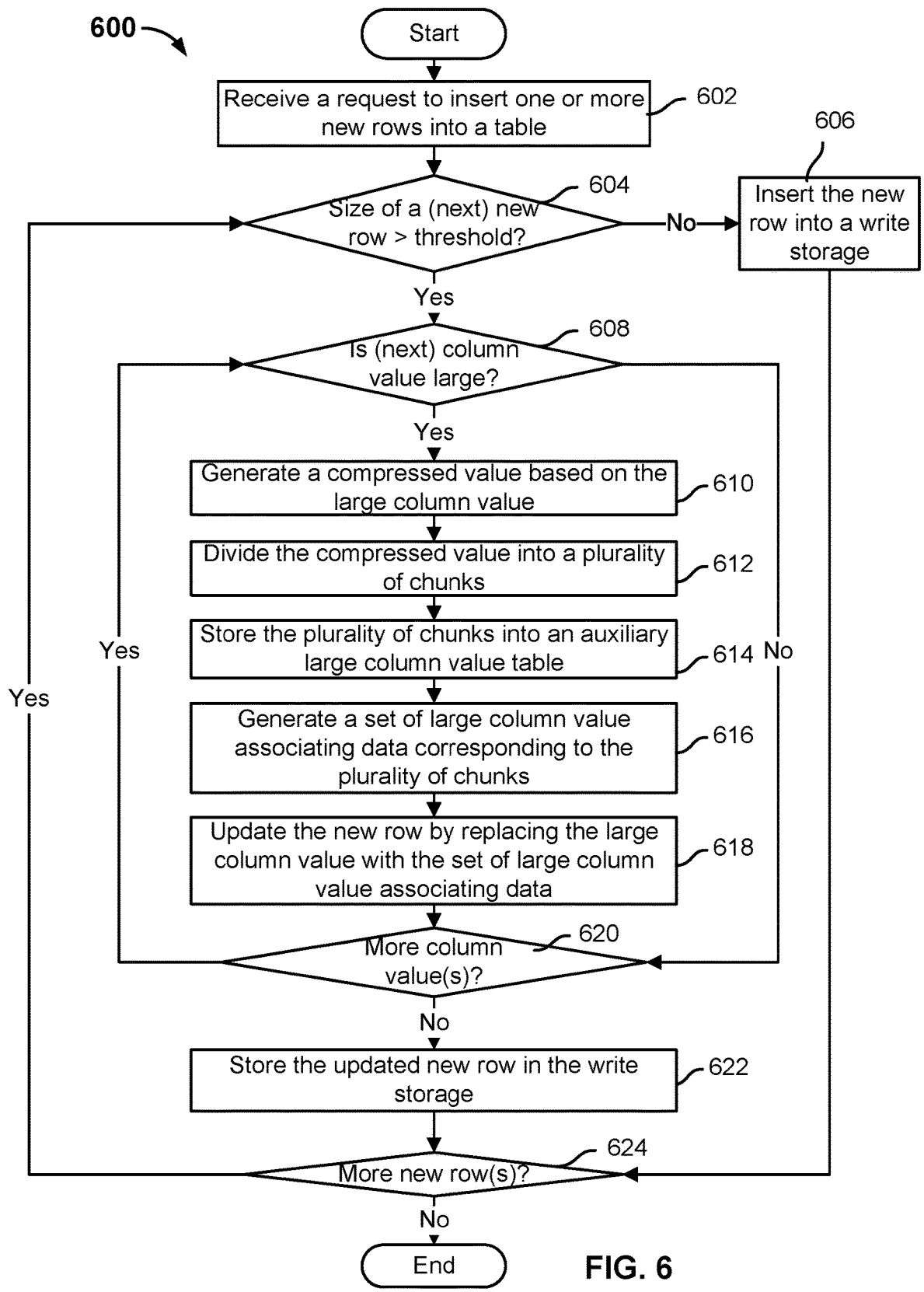
FIG. 6 is a flow diagram showing an example of a process for inserting new row(s) into a table in a database.

FIG. 6 is a flow diagram showing an example of a process for inserting new row(s) into a table in a database. In some embodiments, process 600 is implemented at database system 100 of FIG. 1. In some embodiments, step 304 of process 300 of FIG. 3 may be implemented, at least in part, using process 600.

Process 600 describes an example process of storing newly inserted row(s) at a write storage. Process 600 can be used, for example, to process new rows that are dynamically added to the database.

At 602, a request to insert one or more new rows into a table is received. One or more new rows of data are requested to be added to an existing table in the database. For example, the new rows are requested to be added via an INSERT SQL statement. Each new row includes a corresponding column value (e.g., a NULL or non-NULL value) for each column of the table.

At 604, whether a total size of a (next) new row exceeds a total row size threshold is determined. In the event that the total size of the new row exceeds the total row size threshold, control is transferred to 608. Otherwise, in the event that the total size of the new row does not exceed the total row size threshold, control is transferred to 606. The total size of the new row is determined based at least in part on summing together the size of each column value in the new row. The total size of the new row is then compared against a configured total row size threshold. If the total size of the new row is greater than the configured total row size threshold, then it is determined that the new row likely includes at least one column value that is "large."

At 606, the new row is inserted into a write storage. If the total size of the new row is less than or equal to the total row size threshold, the new row of data is directly inserted into the write storage without needing to check whether any of the column values of the new row is a large column value.

Figure 7:
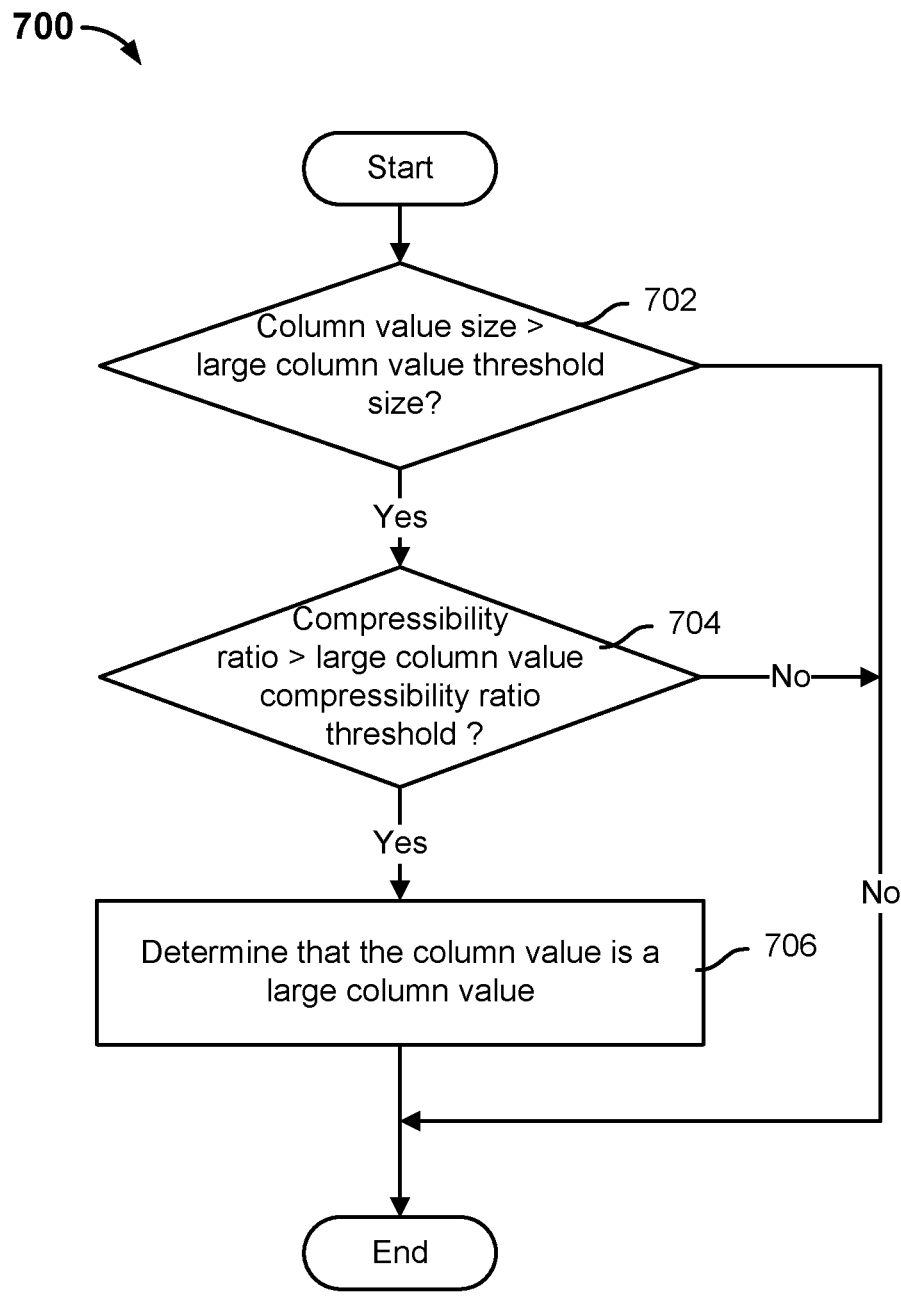
FIG. 7 is a flow diagram showing an example of a process for determining whether a column value is large.

At 608, whether a (next) column value of the new row is large is determined. In the event that the column value is determined to be large, control is transferred to 610. Otherwise, in the event that the column value is determined not to be large, control is transferred to 620. The column value is compared against a set of large column value criteria associated with the write storage. If the column value meets the set of large column value criteria associated with the write storage, then the column value is designated as a "large" column value with respect to the write storage. FIG. 7, below, describes an example process of determining whether a column value is a large column value.

Returning to FIG. 6, at 610, a compressed value is generated based on the large column value. The large column value is compressed using an appropriate compression technique. One example compression technique is the Lempel-Ziz-Welch (LZW) compression technique. In some embodiments, if after the column value is compressed, its compressed size is not smaller or its compressibility ratio (e.g., the quotient of the original size of the column value divided by the compressed size) is not greater than a compressibility ratio threshold, the original, uncompressed column value is used to be stored into the auxiliary large column value table.

At 612, the compressed value is divided into a plurality of chunks. In some embodiments, the compressed large column value is divided into chunks of the same (e.g., predetermined) size. In some embodiments, the compressed large column value is divided into chunks of different sizes. For example, the compressed column value is divided into chunks based on a pre-configured chunk size. As a result, all chunks are of the same size except, potentially, for the last chunk.

At 614, the plurality of chunks is stored into an auxiliary large column value table. Each of the chunks is stored in the auxiliary large column value table. As shown in the example auxiliary large column value table of FIG. 2, in some embodiments, each large column value can be associated with a unique identifier (e.g., ObjectID) and each chunk of the compressed large column value can be associated with a chunk index (e.g., chunkIndex) in the table. In some embodiments, each chunk index denotes an order to be used in reassembling the column value using the corresponding chunk.

At 616, a set of large column value associating data corresponding to the plurality of chunks is generated. A set of large column value associating data, which can be a pointer or a reference value, is to be stored in the write storage in place of the large column value. The set of large column value associating data is much smaller in size than the large column value and so will reduce storage space in the write storage. In various embodiments, the set of large column value associating data includes at least the ObjectID of the large column value, among other information. In some embodiments, the set of large column value associating data also includes, but is not limited to, one or more of the following: the compression technique that was used to compress the large column value, the decompression technique that should be used to decompress the chunks of the compressed large column value in the auxiliary large column value table, the stored size of the large column value (e.g., the size of the large column value after it is compressed, if it was compressed), and the original size of the large column value.

At 618, the new row is updated by replacing the large column value with the set of large column value associating data.

At 620, it is determined whether there are more column value(s) in the new row. In the event that there is at least one more column value in the new row, control is returned to 608. Otherwise, if there are no more column values in the new row, control is transferred to 622.

At 622, the updated new row is stored in the write storage. In some embodiments, the set of large column value associating data is stored in the write storage with a prefix that is different than a prefix associated with a non-large column value in the write storage.

At 624, it is determined whether there are more new row(s) associated with the request to insert. In the event that there is at least one more new row associated with the request to insert, control is returned to 604. Otherwise, if there are no more new rows associated with the request to insert, process 600 ends.

FIG. 7 is a flow diagram showing an example of a process for determining whether a column value is large. In some embodiments, process 700 is implemented at database system 100 of FIG. 1. In some embodiments, step 304 of process 300 of FIG. 3 may be implemented, at least in part, using process 700.

Process 700 describes an example process of determining whether a column value is large according to an example set of large column value criteria. In the example of process 700, the example set of large column value criteria includes a first determination of whether the size of the column value is greater than a configured large column value size threshold and a second determination of whether the compressibility ratio of the column value is greater than a configured compressibility ratio threshold.

At 702, whether a column value size is greater than a large column value threshold size is determined. In the event that the column value size is greater than the large column value threshold size, control is transferred to 704. Otherwise, in the event that the column value size is equal to or less than the large column value threshold, process 700 ends.

At 704, whether a compressibility ratio of the column value is greater than a compressibility ratio threshold is determined. In the event that the compressibility ratio of the column value is greater than the large column value threshold compressibility ratio, control is transferred to 706. Otherwise, in the event that the compressibility ratio of the column value is equal to or less than the large column value threshold compressibility ratio, process 700 ends. In some embodiments, the compressibility ratio of the column value is determined as the quotient of the original size of the column value divided by the size of the column value after it has been compressed. The column value can be compressed using any appropriate compression technique (e.g., LZW).

At 706, the column value is determined to be a large column value.

In actual practice, the determination of 704 may be determined before, concurrently, or after the determination of 702.

Process 700 describes just one example of determining whether a column value meets a set of large column value criteria and in actual practice, various other sets of large column value criteria may be configured.

Figure 8:
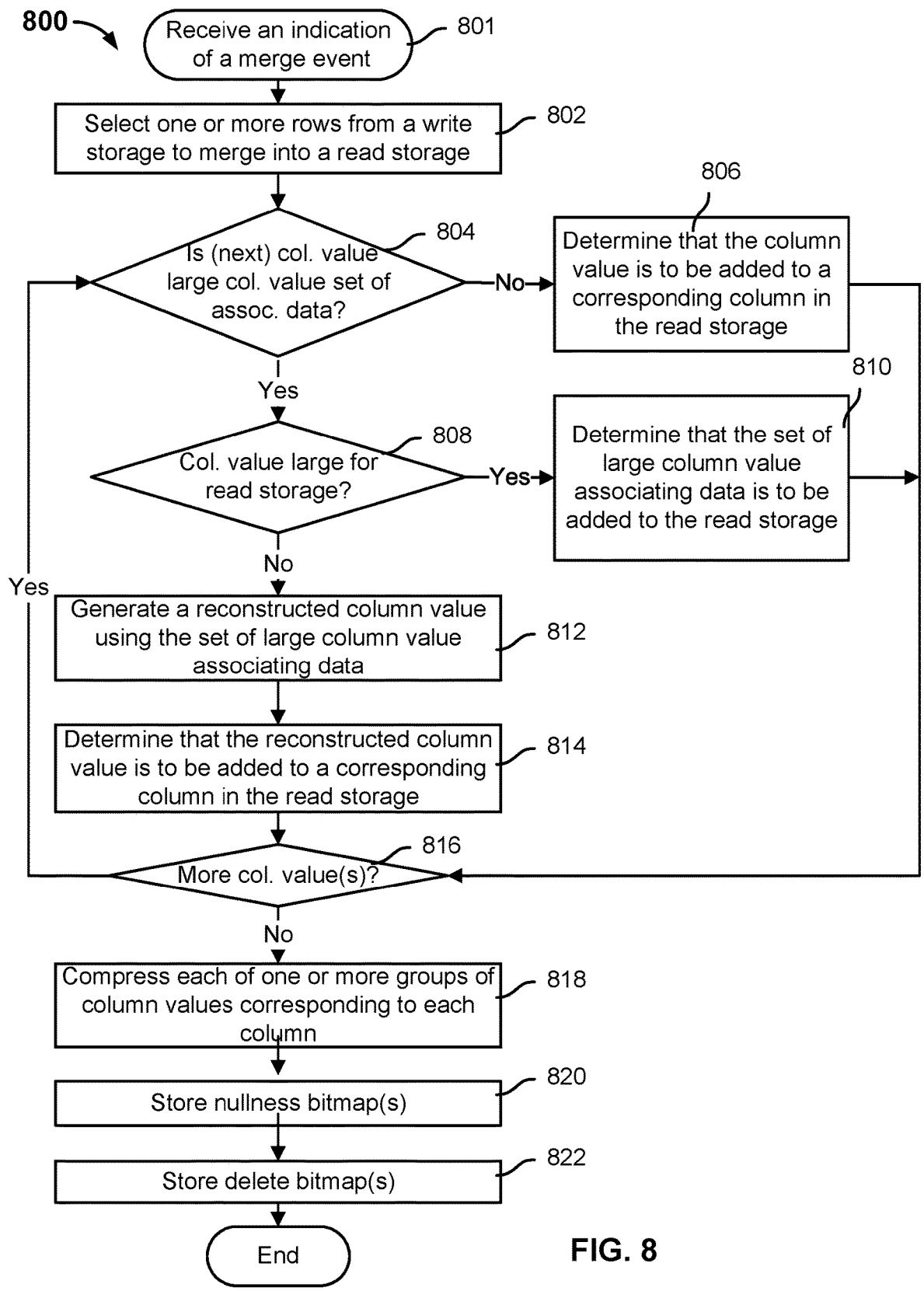
FIG. 8 is a flow diagram showing an example of a process for merging data from a write storage to a read storage.

FIG. 8 is a flow diagram showing an example of a process for merging data from a write storage to a read storage. In some embodiments, process 800 is implemented at database system 100 of FIG. 1. In some embodiments, step 304 of process 300 of FIG. 3 may be implemented, at least in part, using process 800.

In various embodiments described herein, data in a database table from a row-oriented write storage is eventually merged into the same table in a column-oriented read storage. Process 800 describes one example process of how such merging may occur.

In process 800, one auxiliary large column value table corresponding to a database table can be shared by data corresponding to that table across both the write storage and the read storage.

At 801, an indication of a merge event is received. In some embodiments, a merge event is configured to occur on a periodic basis. In some embodiments, a merge event is initiated by a user input.

At 802, one or more rows from a write storage are selected to merge into a read storage. A set of rows to be merged from a table in the write storage is selected based on a configured selection policy. For example, the selection policy may determine to select row(s) randomly, based on the frequency that the rows are accessed from the write storage, based on the frequency that the rows are updated in the write storage, and/or based on the time that the rows have resided in the write storage.

In some embodiments, a counter that tracks the accumulated size of columns in each column is generated and also initialized to zero. There is one such counter for each column. In some embodiments, another counter that tracks the number of the selected row(s) that have been processed so far is generated and also initialized to zero. Then, in some embodiments, the selected row(s) are processed one-by-one for merging. The counters are updated as rows are processed. In some embodiments where the read storage uses the row group variant of the column-oriented storage, column values of the selected row(s) that belong to the same column are grouped together. After each row group is merged, the counters are reset.

In some embodiments, whether the column value is NULL is first determined. If the column value is NULL, then the corresponding bit in its column's corresponding nullness bitmap is set to a nullness value (e.g., a bit value of 1). Otherwise, if the column value is not NULL, then the corresponding bit in its column's corresponding nullness bitmap is set to a non-nullness value (e.g., a bit value of 0).

At 804, whether a (next) column value in the selected row(s) is a set of large column value associating data is determined. In the event that the column value is a set of large column value associating data, control is transferred to 808. Otherwise, in the event that the column value is not a set of large column value associating data, control is transferred to 806.

If the column value is not NULL, it is checked for whether the column value is actually a set of large column value associating data that points to data stored in an auxiliary large column value table. In some embodiments, a column value that is a set of large column value associating data has a corresponding prefix that is different from the prefix from a regular non-large column value.

At 806, the column value is determined to be added to a corresponding column in the read storage. If the column value is not a set of large column value associating data, then it is determined to be stored into the read storage as a non-large column value. In some embodiments, such a column value is therefore added to the corresponding column's grouped values.

At 808, whether the column value is determined to be large for the read storage is determined. In the event that the column value is determined to be large for the read storage, control is transferred to 810. Otherwise, in the event that the column value is determined to be not large for the read storage, control is transferred to 812. It is possible that the write storage and the read storage can be configured with different sets of large column value criteria and therefore, a column value that is considered "large" according to the write storage's set of large column value criteria may not be considered "large" according to the read storage's set of large column value criteria. As such, a column value that was considered to be large with respect to the write storage is checked whether it is considered large with respect to the read storage before it is merged into the read storage. In some embodiments, whether the column value is large for the read storage is determined using at least the original size of the column value that is stored in the set of large column value associating data and a set of large column value criteria associated with the read storage. For example, the original size of the column value and the set of large column value criteria associated with the read storage are used in a process such as process 700 of FIG. 7 to determine whether the column value is large with respect to the read storage.

At 810, the set of large column value associating data is determined to be added to a corresponding column in the read storage and is large with respect to the read storage. If the column value that is pointed to by the set of large column value associating data is large with respect to the read storage, then the set of large column value associating data is determined to be stored into the read storage instead of the column value to which it points. In some embodiments, the set of large column value associating data is therefore added to the corresponding column's grouped values.

At 812, a reconstructed column value is generated using the set of large column value associating data. If the column value that is pointed to by the set of large column value associating data is not large with respect to the read storage, then the column value is retrieved from the auxiliary large column value table and reconstructed. In some embodiments, the set of large column value associating data is used to identify chunk(s) of the compressed column value from the auxiliary large column value table. The identified chunks are used to form the compressed column value and the compressed column value is decompressed (e.g., using the decompression technique that is indicated in the set of large column value associating data) to reconstruct the original column value. For example, the chunks are reassembled in an order based on their respective chunkIndex. In some embodiments, the original size of the column value and the stored size of the column value are then extracted from the set of large column value associating data. If the two sizes are not equal, the assembled value is decompressed to finish reconstructing the original column value. But if the two sizes are equal, then the assembled value is the reconstructed original column value. In some embodiments, the reconstructed column value is therefore added to the corresponding column's grouped values.

At 814, the reconstructed column value is determined to be added to a corresponding column in the read storage. In some embodiments, the reconstructed column value is therefore added to the corresponding column's grouped values.

At 816, whether there are more column value(s) in the selected row(s) is determined. In the event that there is at least one more column value in the selected row(s), control is returned to 804. Otherwise, in the event that there are no more column values in the selected row(s), control is transferred to 818.

In some embodiments where the read storage uses the row group variant of the column-oriented storage, after a selected row is processed, it is determined whether any of the following conditions have been met: if the accumulated size of any of the individual columns' values exceeds a configured row group accumulated size threshold, if the number of rows processed so far exceeds a configured row group number threshold (e.g., the designated number of rows in each row group of the column-oriented storage), or if all the rows selected for merging have been processed. If none of the above three conditions have been met, the next selected row is continued to be processed. Otherwise, the system declares the completion of the current row group. By limiting the total sizes of any individual column to be under a configured threshold, it is guaranteed that later when the column is decompressed, the memory space required to store the decompressed column values does not exceed the configured threshold. This effectively reduces the possibility of running out-of-memory (i.e., memory bloating).

At 818, each of one or more groups of column values corresponding to each column is compressed. Column values belonging to each column are compressed to save on storage space in the read storage. As mentioned below, compressing values belonging to the same column may result in greater compression and space saving because values in the same column are of the same data type. In some embodiments where the read storage uses the row group variant of the column-oriented storage, each row group (a subset of rows) of each column is compressed. As mentioned above, compressing row groups may result in quicker processing of requests that query only portions of a column.

At 820, nullness bitmap(s) are stored. One or more nullness bitmaps corresponding to the table are stored in the read storage. For example, each nullness bitmap corresponds to each row group of the table in the read storage.

At 822, delete bitmap(s) are stored. One or more delete bitmaps corresponding to the table are stored in the read storage where all the bits are set to non-deleted values (e.g., bit values of zeroes). For example, each delete bitmap corresponds to each row group of the table in the read storage.

Figure 9:
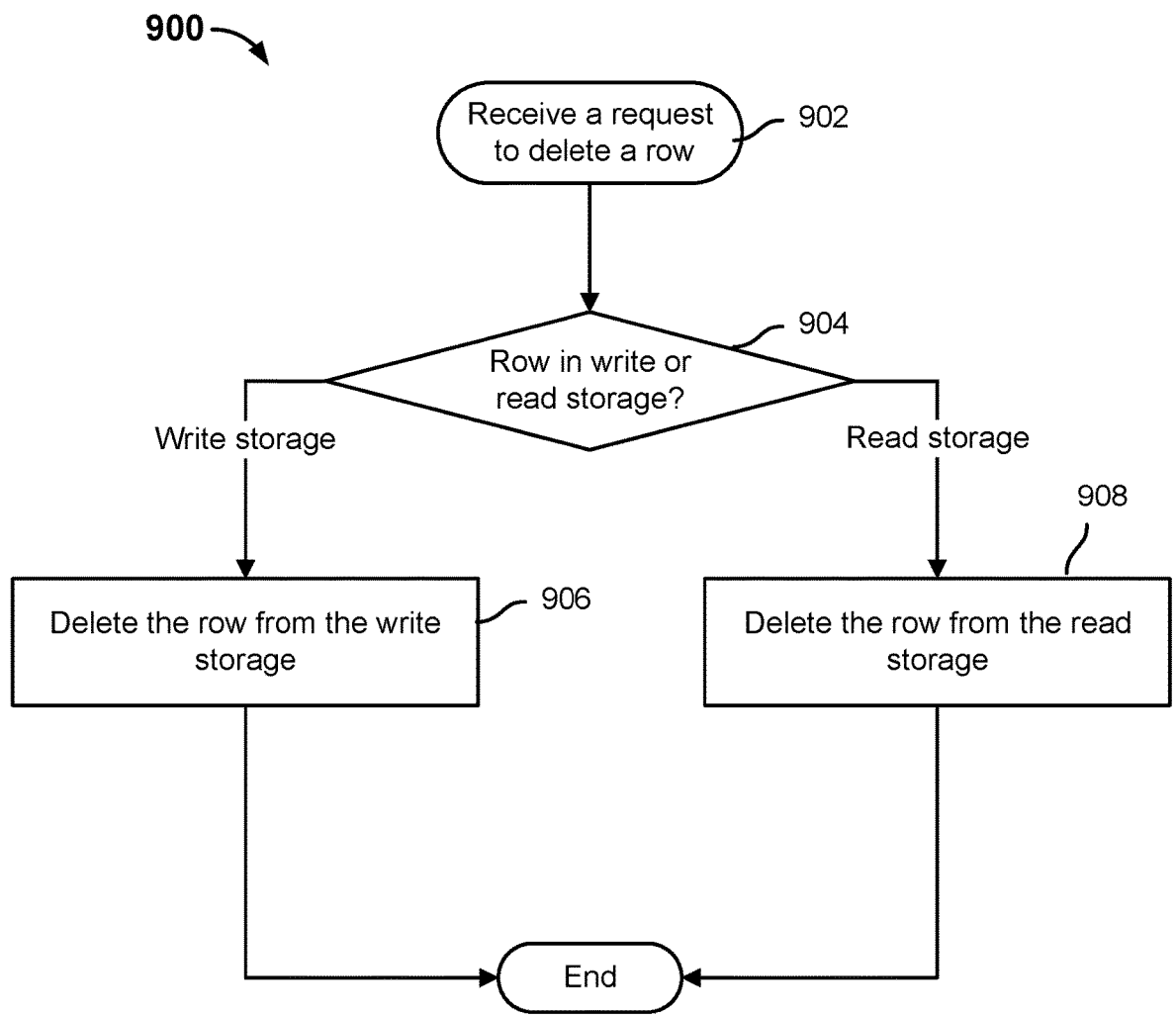
FIG. 9 is a flow diagram showing an example of a process for deleting a row from a database.

FIG. 9 is a flow diagram showing an example of a process for deleting a row from a database. In some embodiments, process 900 is implemented at database system 100 of FIG. 1. In some embodiments, step 304 of process 300 of FIG. 3 may be implemented, at least in part, using process 900.

In example process 900, the database includes at least a write storage and a read storage. As such, the row that is requested to be deleted may reside in either the write storage or the read storage.

At 902, a request to delete a row is received. In some embodiments, deleting rows is done by executing a DELETE SQL statement. In the DELETE SQL statement, a set of selection criteria (also known as "predicates") is specified. All the rows that satisfy the selection criteria are subject to deletion. If no selection criteria is specified, then all rows in the tables are to be deleted. For example, user may delete a row from the example table of FIG. 1 by using the following DELETE statement: DELETE FROM employee_table WHERE name='Kurt_Lewis'.

At 904, whether the row is a write storage or a read storage is determined. In the event that the row is in the write storage, control is transferred to 906. Otherwise, in the event that the row is in the read storage, control is transferred to 908. In some embodiments, the write storage and the read storage are searched serially or in parallel for the requested row.

Figure 10:
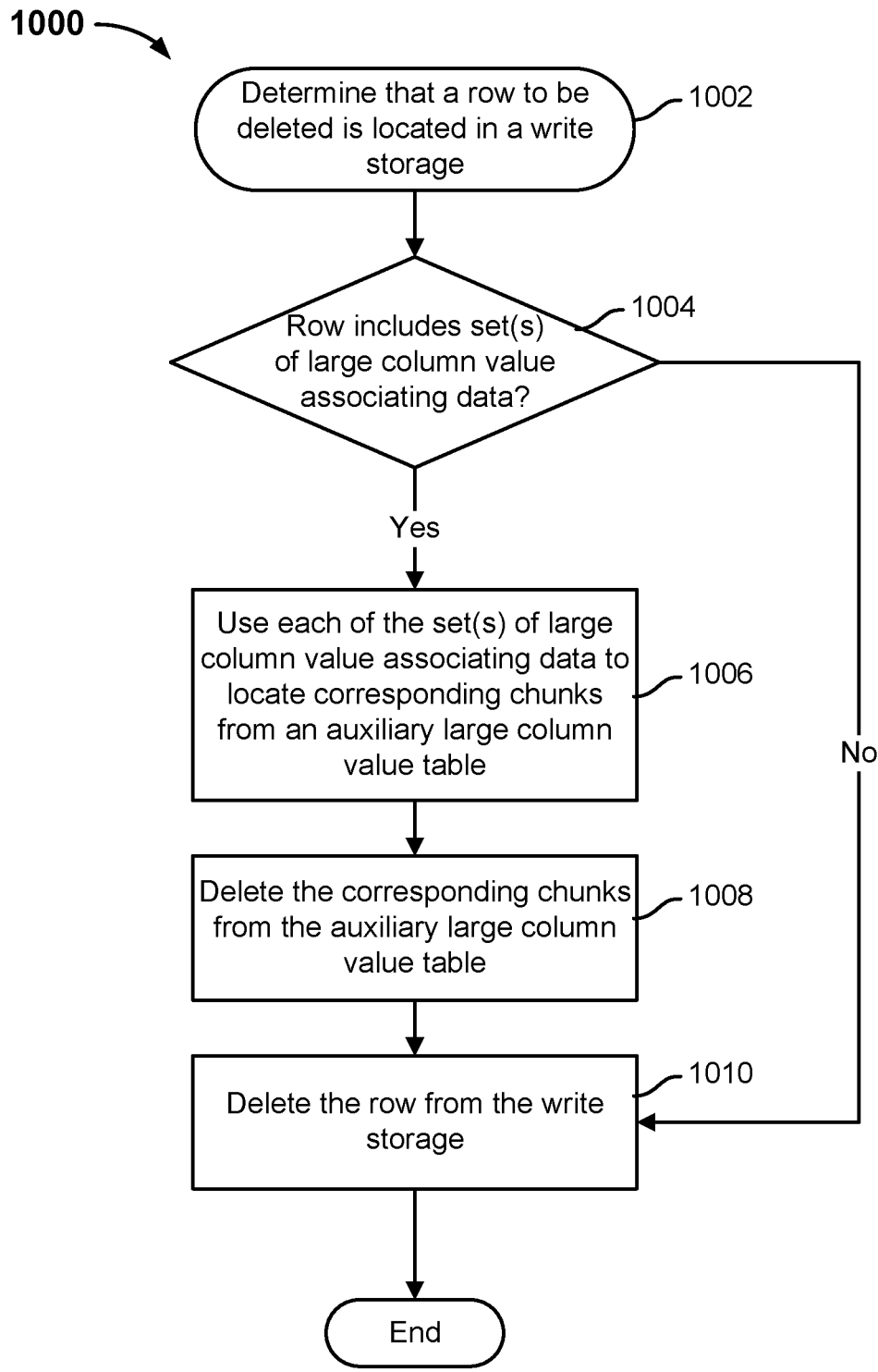
FIG. 10 is a flow diagram showing an example of a process for deleting a row from a write storage of a database.

At 906, the row is deleted from the write storage. FIG. 10, below, describes an example process of deleting a row from the write storage.

Figure 11:
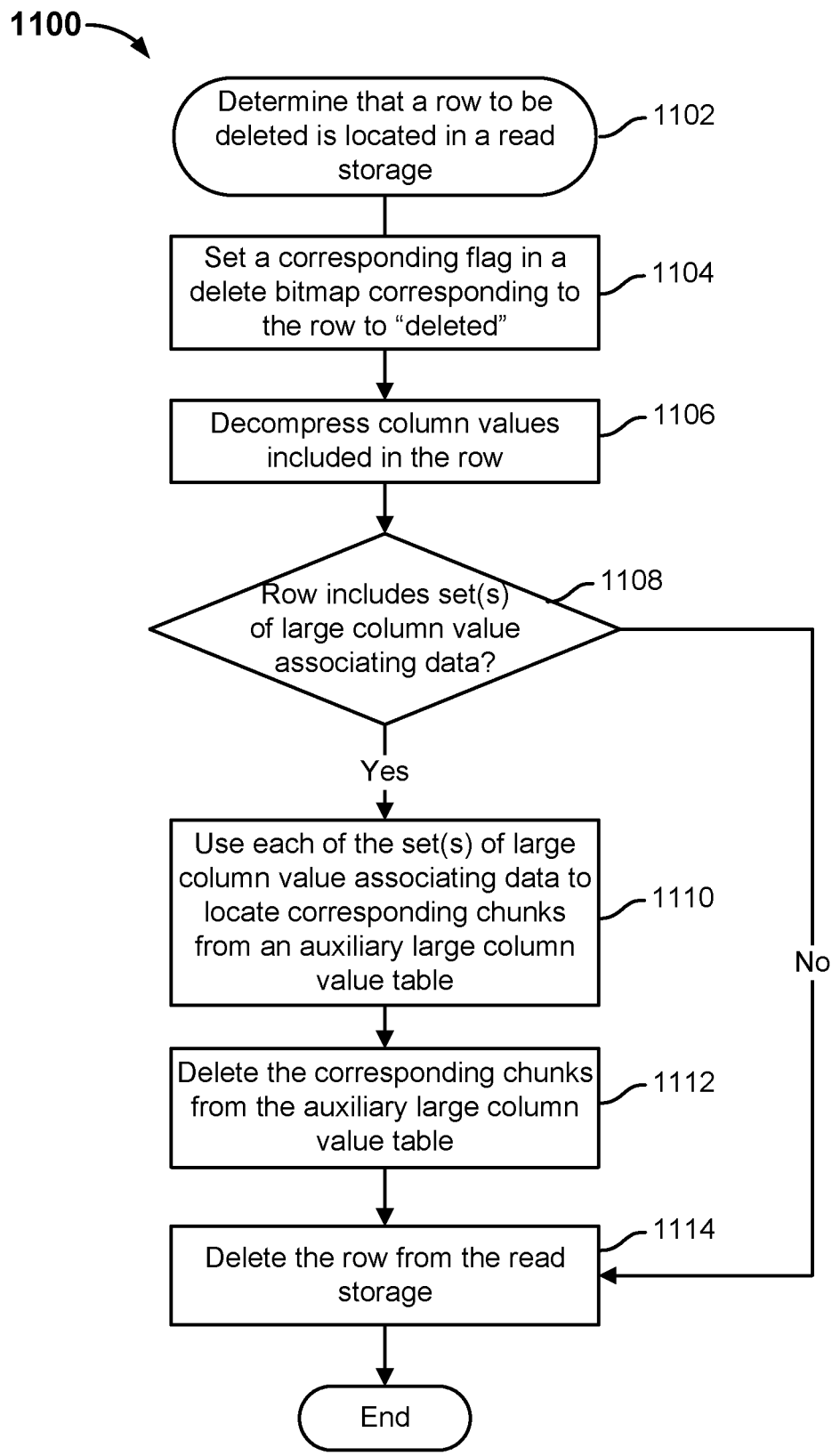
FIG. 11 is a flow diagram showing an example of a process for deleting a row from a read storage of a database.

At 908, the row is deleted from the read storage. FIG. 11, below, describes an example process of deleting a row from the read storage.

FIG. 10 is a flow diagram showing an example of a process for deleting a row from a write storage of a database. In some embodiments, process 1000 is implemented at database system 100 of FIG. 1. In some embodiments, step 304 of process 300 of FIG. 3 may be implemented, at least in part, using process 1000. In some embodiments, step 906 of process 900 of FIG. 9 may be implemented, at least in part, using process 1000.

At 1002, a row to be deleted is determined to be located in a write storage.

At 1004, whether the row includes one or more sets of large column value associating data is determined. In the event that the row includes set(s) of large column value associating data, control is transferred to 1006. Otherwise, in the event that the row does not include a set of large column value associating data, control is transferred to 1010. If the row includes at least one set of large column value associating data, then it is indicative that large column value(s) associated with the row are stored in and should be deleted from an auxiliary large column value table. However, if the row does not include any sets of large column value associating data, then it is indicative that the row is not associated with any large column values and can therefore be directly deleted from the write storage.

At 1006, each of the set(s) of large column value associating data is used to locate corresponding chunks from an auxiliary large column value table. In some embodiments, each set of large column value associating data is used to locate one or more chunks of a corresponding compressed large column value from the auxiliary large column value table.

At 1008, the corresponding chunks are deleted from the auxiliary large column value table. The chunks in the auxiliary large column value table corresponding to each set of large column value associating data are identified and deleted such that the auxiliary large column value table no longer stores any large column values associated with the row to be deleted.

At 1010, the row is deleted from the write storage.

FIG. 11 is a flow diagram showing an example of a process for deleting a row from a read storage of a database. In some embodiments, process 1100 is implemented at database system 100 of FIG. 1. In some embodiments, step 304 of process 300 of FIG. 3 may be implemented, at least in part, using process 1100. In some embodiments, step 908 of process 900 of FIG. 9 may be implemented, at least in part, using process 1100.

At 1102, a row to be deleted is determined to be located in a read storage.

At 1104, a corresponding flag corresponding to the row in a delete bitmap is set to "deleted." In some embodiments where the read storage uses the row group variant of the column-oriented storage, each row group (a subset of rows) of each column has a corresponding delete bitmap. The delete bitmap corresponding to the row is updated such that the value (e.g., bit) corresponding to that row indicates to delete the row. In some embodiments, rows for which corresponding portions of delete bitmap(s) indicate to delete are eventually overwritten, reclaimed, or garbage collected.

In some embodiments, steps 1106-1114 may be performed by a background process. For example, the background process checks if a row group in the read storage has deleted rows according to a corresponding delete bitmap. If it is determined that any row group has deleted rows, steps 1106 through 1114 are performed by the background process for each of the deleted rows.

At 1106, column values that are included in the row are decompressed. In various embodiments, column values of the same column in the read storage are compressed together. In some embodiments where the read storage uses the row group variant of the column-oriented storage, the column values of each row group (a subset of rows) of each column are compressed together. The compressed groups of column values are decompressed to recover the original column values of the row to be deleted.

At 1108, whether the row includes one or more sets of large column value associating data is determined. In the event that the row includes set(s) of large column value associating data, control is transferred to 1110. Otherwise, in the event that the row does not include a set of large column value associating data, control is transferred to 1114. If the row includes at least one set of large column value associating data, then it is indicative that large column value(s) associated with the row are stored in and should be deleted from an auxiliary large column value table. However, if the row does not include any sets of large column value associating data, then it is indicative that the row is not associated with any large column values and can therefore be directly deleted from the read storage.

At 1110, each of the set(s) of large column value associating data is used to locate corresponding chunks from an auxiliary large column value table. In some embodiments, each set of large column value associating data is used to locate one or more chunks of a corresponding compressed large column value from the auxiliary large column value table.

At 1112, the corresponding chunks are deleted from the auxiliary large column value table. The chunks in the auxiliary large column value table corresponding to each set of large column value associating data are identified and deleted such that the auxiliary large column value table no longer stores any large column values associated with the row to be deleted.

At 1114, the row is deleted from the read storage. After a result of the corresponding flag in the delete bitmap being set to "deleted," the row is eventually deleted (e.g., reclaimed/ garbage collected) using a background process.

Figure 12:
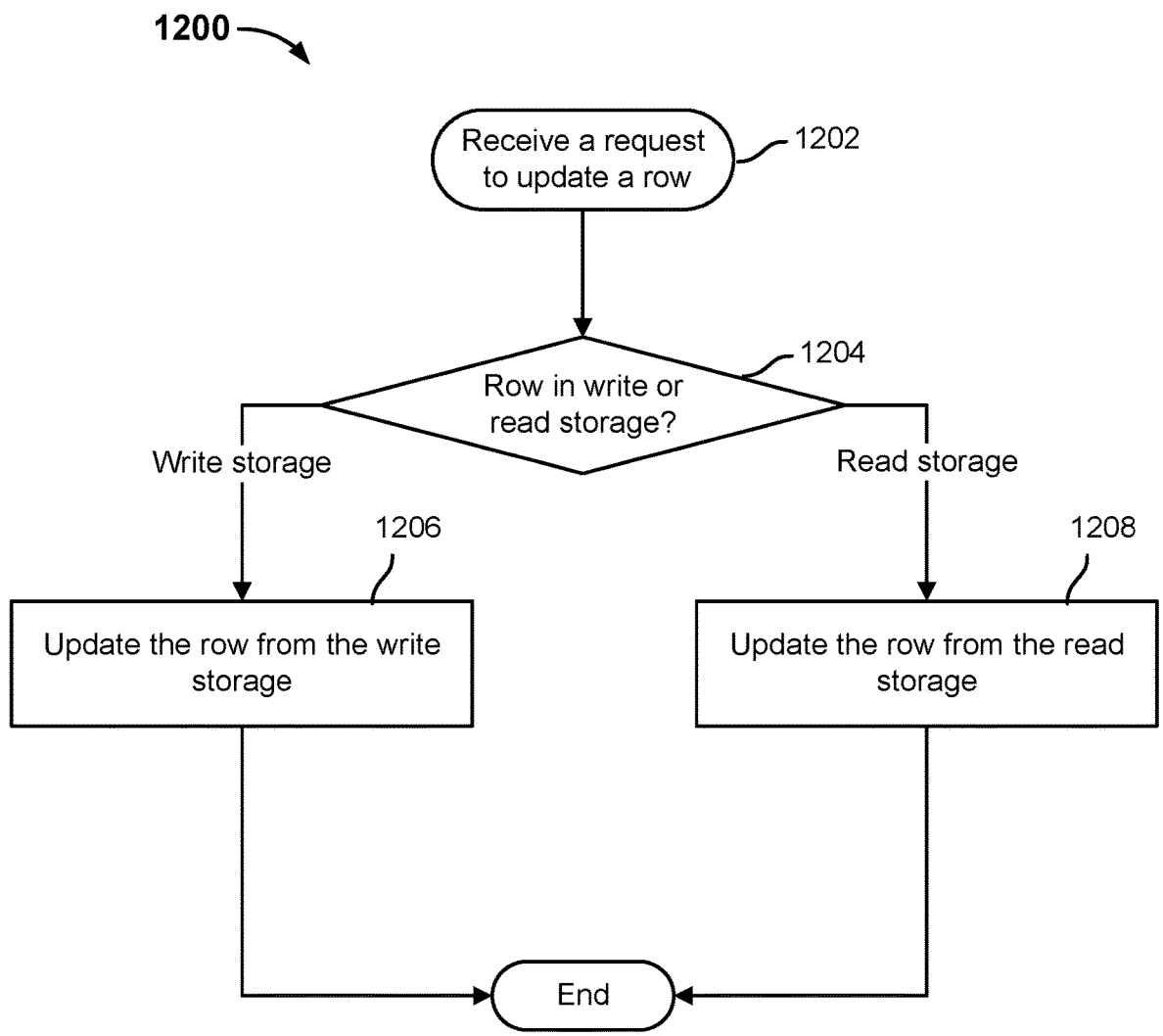
FIG. 12 is a flow diagram showing an example of a process for updating a row in a database.

FIG. 12 is a flow diagram showing an example of a process for updating a row in a database. In some embodiments, process 1200 is implemented at database system 100 of FIG. 1. In some embodiments, step 304 of process 300 of FIG. 3 may be implemented, at least in part, using process 1200.

In example process 1200, the database includes at least a write storage and a read storage. As such, the row that is requested to be updated may reside in either the write storage or the read storage.

At 1202, a request to update a row is received. In some embodiments, the request to update includes information that identifies an existing row and also includes new column value(s) to replace at least a subset of the existing column values in the row. For example, the request to update may be an UPDATE SQL statement. In some embodiments, updating is similar to deletion. For example, an UPDATE SQL statement may be used to update one or multiple rows. In the UPDATE SQL statement, a set of selection criteria (also termed "predicates"). All the rows that satisfy the selection criteria are to be updated. For example, one can update a row in the example table of FIG. 1 by using the following UPDATE SQL statement: UPDATE employee_table SET Imge='Image_018' WHERE Name='Mike_Yang'. This changes Mike_Yang's image to 'Image_018'.

At 1204, whether the row is a write storage or a read storage is determined. In the event that the row is in the write storage, control is transferred to 1206. Otherwise, in the event that the row is in the read storage, control is transferred to 1208. In some embodiments, the write storage and the read storage are searched serially or in parallel for the requested row.

Figure 13:
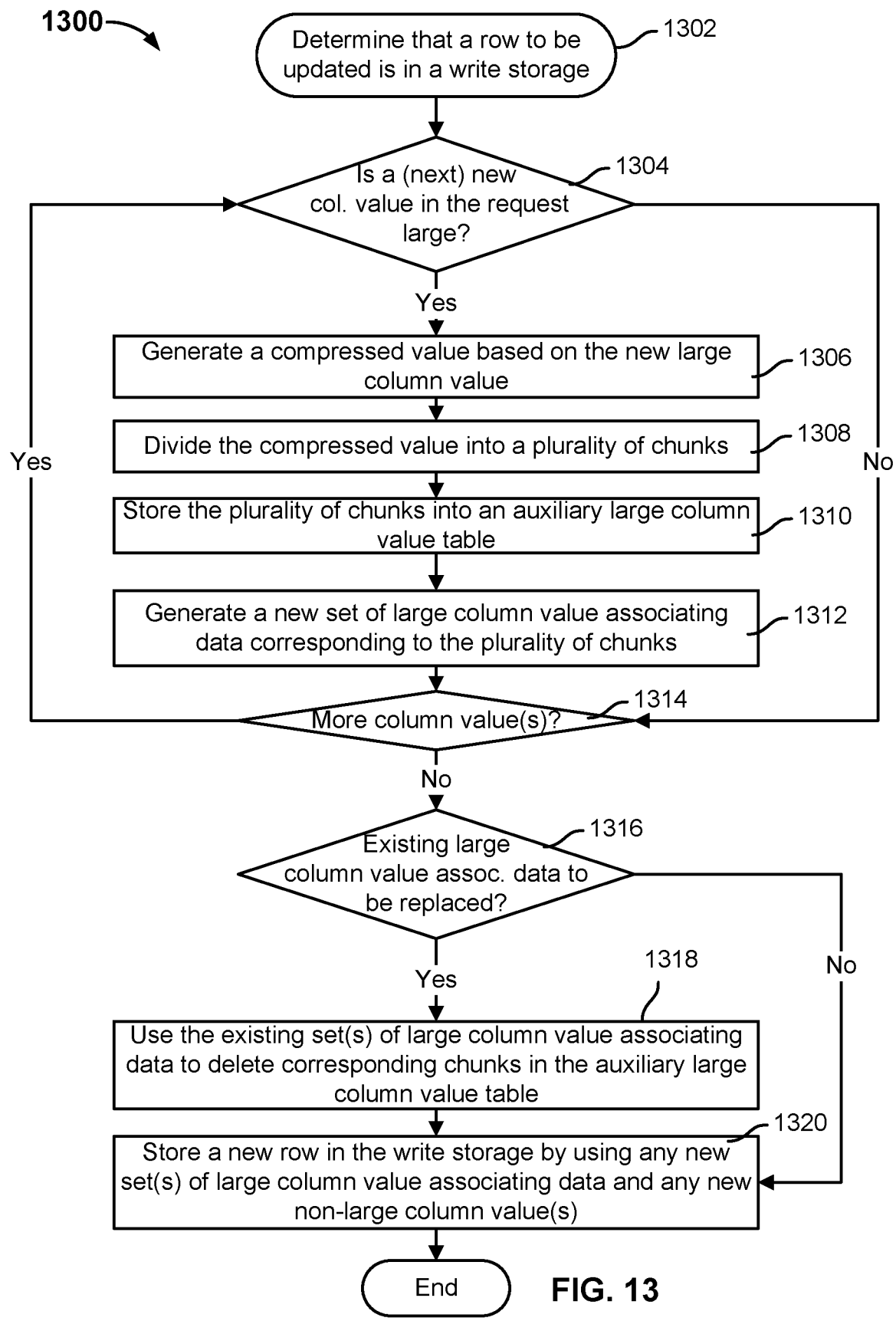
FIG. 13 is a flow diagram showing an example of a process for updating a row in a write storage in a database.

At 1206, the row is updated from the write storage. FIG. 13, below, describes an example process of updating a row from the write storage.

Figure 14:
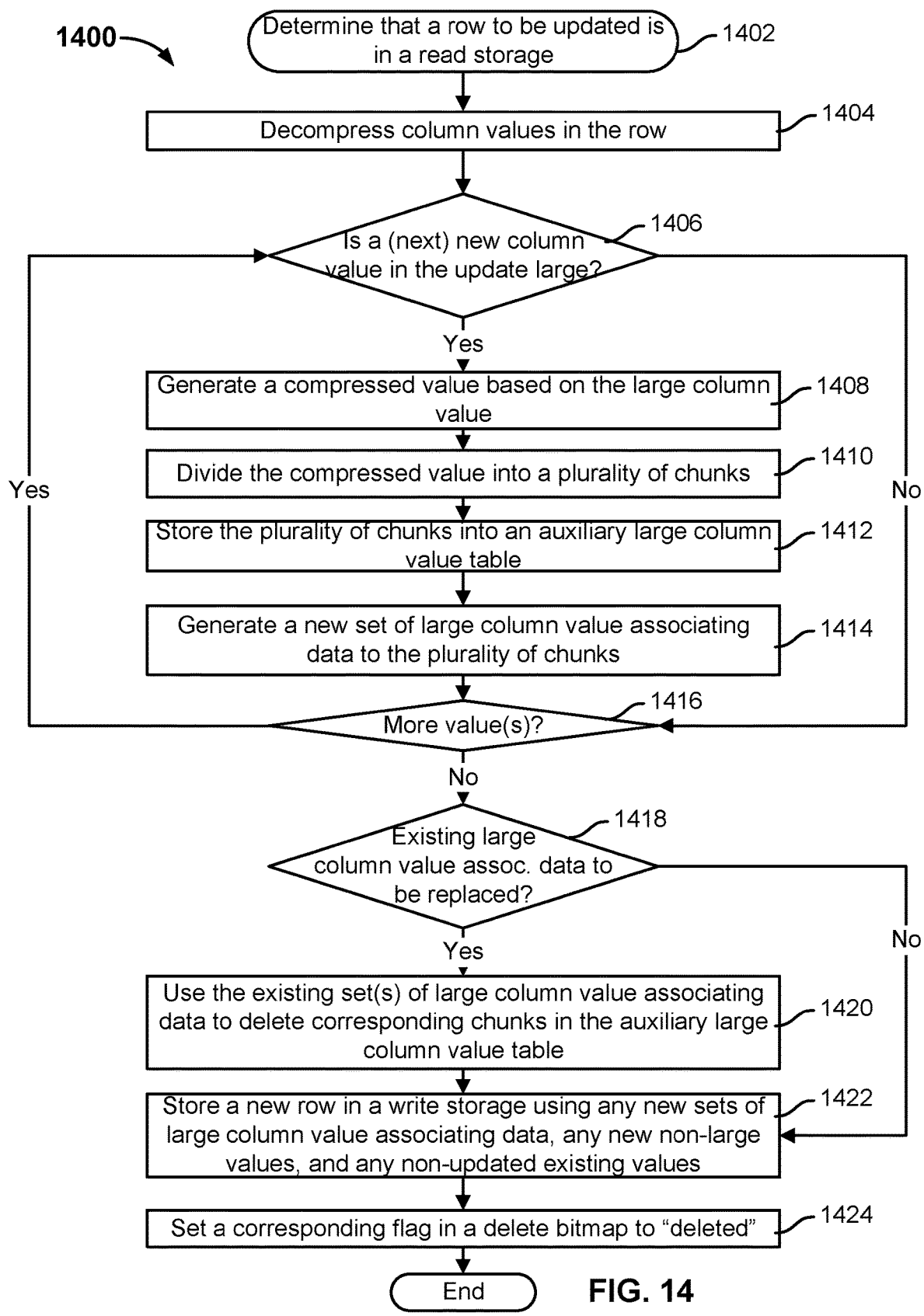
FIG. 14 is a flow diagram showing an example of a process for updating a row in a read storage in a database.

At 1208, the row is updated from the read storage. FIG. 14, below, describes an example process of updating a row from the read storage.

FIG. 13 is a flow diagram showing an example of a process for updating a row in a write storage in a database. In some embodiments, process 1300 is implemented at database system 100 of FIG. 1. In some embodiments, step 304 of process 300 of FIG. 3 may be implemented, at least in part, using process 1300. In some embodiments, step 1206 of process 1200 of FIG. 12 may be implemented, at least in part, using process 1300.

At 1302, a row to be updated is determined to be in a write storage.

At 1304, whether a (next) new column value in the request is large is determined. In the event that the new column value is large, control is transferred to 1306. Otherwise, in the event that the new column value is not large, control is transferred to 1314. The new column value that is included in the request to update is determined whether it is large with respect to the write storage. In some embodiments, to determine whether the new column value is large, it is compared against a set of large column value criteria associated with the write storage. For example, determining whether the new column value is large using a set of large column value criteria associated with the write storage may be implemented using a process such as process 700 of FIG. 7, above.

At 1306, a compressed value is generated based on the new large column value. The large column value is compressed using an appropriate compression technique. One example compression technique is the Lempel-Ziz-Welch (LZW) compression technique. In some embodiments, if after the column value is compressed, its compressed size is not smaller or its compressibility ratio (e.g., the quotient of the original size of the column value divided by the compressed size) is not greater than a compressibility ratio threshold, the original, uncompressed column value is used to be stored into the auxiliary large column value table.

At 1308, the compressed value is divided into a plurality of chunks. In some embodiments, the compressed large column value is divided into chunks of the same size. In some embodiments, the compressed large column value is divided into chunks of different sizes.

At 1310, the plurality of chunks is stored into an auxiliary large column value table. Each of the chunks is stored in the auxiliary large column value table. As shown in the example auxiliary large column value table of FIG. 2, in some embodiments, each large column value can be associated with a unique identifier (e.g., ObjectID) and each chunk of the compressed large column value can be associated with a chunk index (e.g., chunkIndex) in the table.

At 1312, a set of large column value associating data corresponding to the plurality of chunks is generated. A set of large column value associating data, which can be a pointer or a reference value, is to be stored in the write storage in place of the large column value. The set of large column value associating data is much smaller in size than the large column value and so will reduce storage space in the write storage. In various embodiments, the set of large column value associating data includes at least the ObjectID of the large column value, among other information. In some embodiments, the set of large column value associating data also includes, but is not limited to, one or more of the following: the compression technique that was used to compress the large column value, the decompression technique that should be used to decompress the chunks of the compressed large column value in the auxiliary large column value table, the size of the large column value after it is compressed, and the original size of the large column value.

At 1314, whether there are more new column values in the update is determined. In the event that there is at least one more new column value in the request to update, control is returned to 1304. Otherwise, in the event that there are no more new column value(s) in the request to update, control is transferred to 1316.

At 1316, whether there are any existing set(s) of large column value associating data in the row that are to be replaced by a new column value in the request is determined. In the event that there is at least one existing set of large column value associating data in the row that is to be replaced, control is transferred to 1318. Otherwise, in the event that there are no existing set(s) of large column value associating data in the row that are to be replaced, control is transferred to 1320.

At 1318, the existing set(s) of large column value associating data are used to delete corresponding chunks in the auxiliary large column value table. In some embodiments, each set of large column value associating data is used to locate one or more chunks of a corresponding compressed large column value from the auxiliary large column value table. The chunks in the auxiliary large column value table corresponding to each set of large column value associating data are identified and deleted such that the auxiliary large column value table no longer stores any large column values that are to be replaced.

At 1320, a new row is stored in the write storage using any new set(s) of large column value associating data and any new non-large column value(s). A new row (i.e., a new version of the row) is added to the write storage such that in the new row, existing column values of the previous version row that are to be replaced by new column values of the request to update are replaced by such new column values if they are not deemed "large" with respect to the write storage, or they are replaced by corresponding new sets of auxiliary large column value associating data if they are deemed "large" with respect to the write storage. In some embodiments, associating data that links the new version of the row to its previous version(s) is stored.

FIG. 14 is a flow diagram showing an example of a process for updating a row in a read storage in a database. In some embodiments, process 1400 is implemented at database system 100 of FIG. 1. In some embodiments, step 304 of process 300 of FIG. 3 may be implemented, at least in part, using process 1400. In some embodiments, step 1208 of process 1200 of FIG. 12 may be implemented, at least in part, using process 1400.

At 1402, a row to be updated is determined to be in a read storage.

At 1404, column values that are included in the row are decompressed. In various embodiments, column values of the same column in the read storage are compressed together. In some embodiments where the read storage uses the row group variant of the column-oriented storage, the column values of each row group (a subset of rows) of each column are compressed together. The compressed groups of column values are decompressed to recover the original column values of the row to be updated.

At 1406, whether a (next) new column value in the request is large is determined. In the event that the new column value is large, control is transferred to 1408. Otherwise, in the event that the new column value is not large, control is transferred to 1416. The new column that is included in the request to update is determined whether it is large with respect to the read storage. In some embodiments, to determine whether the new column value is large, it is compared against a set of large column value criteria associated with the read storage. For example, determining whether the new column value is large using a set of large column value criteria associated with the read storage may be implemented using a process such as process 700 of FIG. 7, above.

At 1408, a compressed value is generated based on the new large column value. The large column value is compressed using an appropriate compression technique. One example compression technique is the Lempel-Ziz-Welch (LZW) compression technique. In some embodiments, if after the column value is compressed, its compressed size is not smaller or its compressibility ratio (e.g., the quotient of the original size of the column value divided by the compressed size) is not greater than a compressibility ratio threshold, the original, uncompressed column value is used to be stored into the auxiliary large column value table.

At 1410, the compressed value is divided into a plurality of chunks. In some embodiments, the compressed large column value is divided into chunks of the same size. In some embodiments, the compressed large column value is divided into chunks of different sizes.

At 1412, the plurality of chunks is stored into an auxiliary large column value table. Each of the chunks is stored in the auxiliary large column value table. As shown in the example auxiliary large column value table of FIG. 2, in some embodiments, each large column value can be associated with a unique identifier (e.g., ObjectID) and each chunk of the compressed large column value can be associated with a chunk index (e.g., chunkIndex) in the table.

At 1414, a set of large column value associating data corresponding to the plurality of chunks is generated. A set of large column value associating data, which can be a pointer or a reference value, is to be stored in the write storage in place of the large column value. The set of large column value associating data is much smaller in size than the large column value and so will reduce storage space in the write storage. In various embodiments, the set of large column value associating data includes at least the ObjectID of the large column value, among other information. In some embodiments, the set of large column value associating data also includes, but is not limited to, one or more of the following: the compression technique that was used to compress the large column value, the decompression technique that should be used to decompress the chunks of the compressed large column value in the auxiliary large column value table, the size of the large column value after it is compressed, and the original size of the large column value.

At 1416, whether there are more new column values in the update is determined. In the event that there is at least one more new column value in the request to update, control is returned to 1406. Otherwise, in the event that there are no more new column value(s) in the request to update, control is transferred to 1418.

At 1418, whether there are any existing set(s) of large column value associating data in the row that are to be replaced by a new column value in the request is determined. In the event that there is at least one existing set of large column value associating data in the row that is to be replaced, control is transferred to 1420. Otherwise, in the event that there are no existing set(s) of large column value associating data in the row that are to be replaced, control is transferred to 1422.

At 1420, the existing set(s) of large column value associating data are used to delete corresponding chunks in the auxiliary large column value table. In some embodiments, each set of large column value associating data is used to locate one or more chunks of a corresponding compressed large column value from the auxiliary large column value table. The chunks in the auxiliary large column value table corresponding to each set of large column value associating data are identified and deleted such that the auxiliary large column value table no longer stores any large column values that are to be replaced.

At 1422, a new row is stored in a write storage using any new set(s) of large column value associating data, any new non-large column value(s), and any non-updated existing values. A new row is inserted into the write storage, where any existing column values of the row to update that are to be replaced by new non-large column values of the request to update are replaced by such new column values, and any existing column values that are to be replaced by new large column values of the request to update are replaced by corresponding new sets of auxiliary large column value associating data. The new row also includes any existing column values of the row to update that were not designated to be updated by a new column value of the request. For example, existing column values may include non-large column values or sets of large column value associating data.

At 1424, a corresponding flag in a delete bitmap is set to "deleted." In some embodiments where the read storage uses the row group variant of the column-oriented storage, each row group (a subset of rows) of each column has a corresponding delete bitmap. The delete bitmap corresponding to the row is updated such that the value (e.g., bit) corresponding to that row indicates to delete the row. In some embodiments, rows for which corresponding portions of delete bitmap(s) indicate to delete are eventually overwritten, reclaimed, or garbage collected from the read storage.

Figure 15:
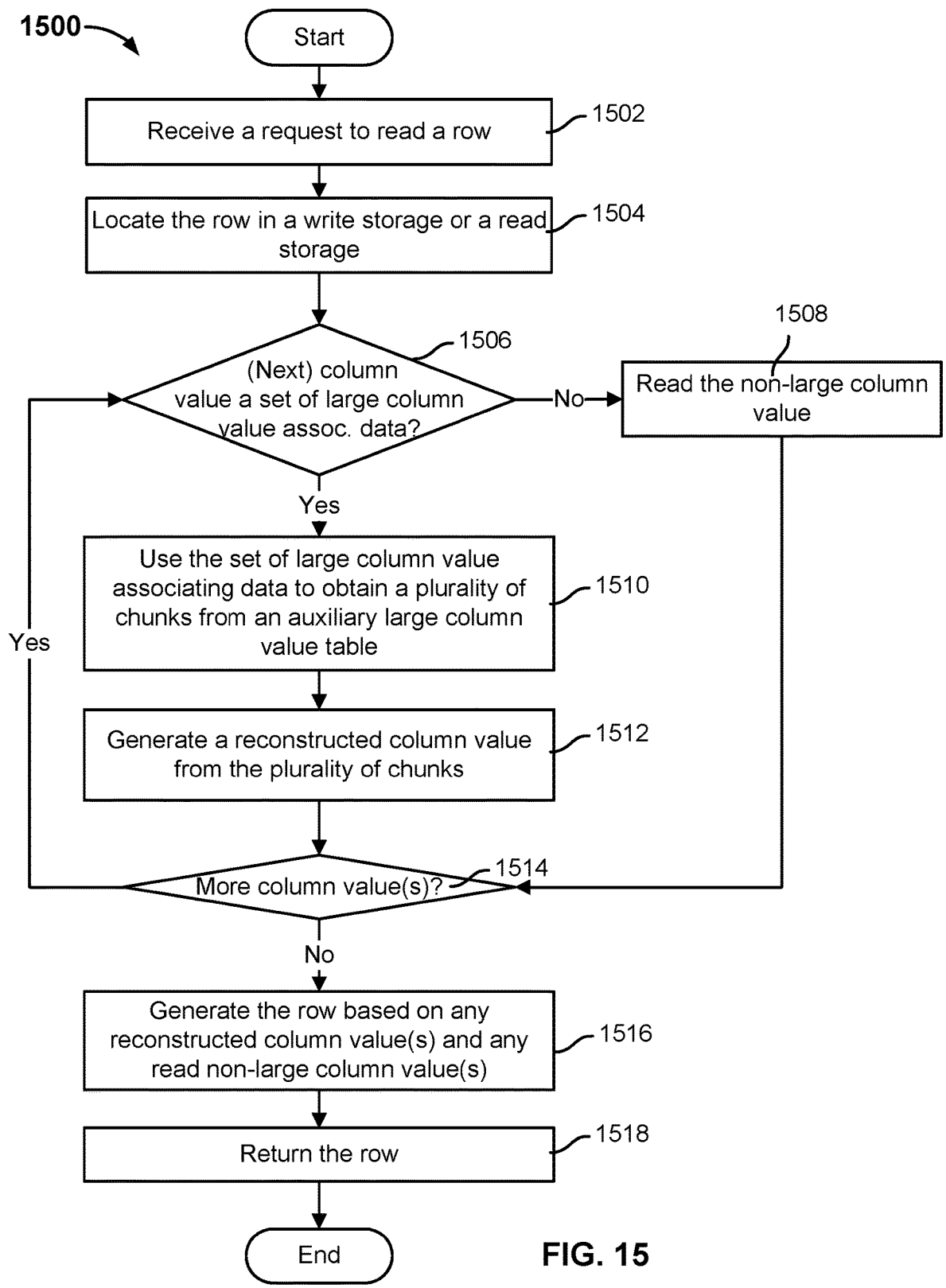
FIG. 15 is a flow diagram showing an example of a process for reading a row from a database.

FIG. 15 is a flow diagram showing an example of a process for reading a row from a database. In some embodiments, process 1500 is implemented at database system 100 of FIG. 1. In some embodiments, step 304 of process 300 of FIG. 3 may be implemented, at least in part, using process 1500.

Process 1500 is an example process describing that when a row is read from a database, its corresponding column values that are not large column values can be read directly while its corresponding column values that are large column values need to be retrieved and reconstructed from an auxiliary large column value table.

At 1502, a request to read a row is received.

At 1504, the row is located in a write storage or a read storage. The requested row can be in only one of the write storage or the read storage. The write storage and the read storage can be searched serially or in parallel for the row.

At 1506, whether a (next) column value of the row is a set of large column value associating data is determined. In the event that the column value is a large column value, control is transferred to 1510. Otherwise, in the event that the column value is a non-large column value, control is transferred to 1508. In some embodiments, a set of large column value associating data stored in either the write storage or the read storage includes a different prefix than the prefix of a non-large column value stored in either the write storage or the read storage.

At 1508, the non-large column value is read.

At 1510, the set of large column value associating data is used to obtain a plurality of chunks from an auxiliary large column value table. In some embodiments, the set of large column value associating data is used to identify/read chunk (s) of the compressed column value from the auxiliary large column value table.

At 1512, a reconstructed column value is generated from the plurality of chunks. For example, the chunks are reassembled in an order based on their respective chunkIndex. In some embodiments, the original size of the column value and the stored size of the column value are then extracted from the set of large column value associating data. If the two sizes are not equal, the assembled value is decompressed to finish reconstructing the original column value. But if the two sizes are equal, then the assembled value is the reconstructed original column value. In some embodiments, the reconstructed column value is therefore added to the corresponding column's grouped values. The identified chunks are used to form the compressed column value and the compressed column value is decompressed (e.g., using the decompression technique that is indicated in the set of large column value associating data) to reconstruct the original column value.

At 1514, it is determined whether there are more column value(s) in the new row. In the event that there is at least one more column value in the row, control is returned to 1506. Otherwise, if there are no more column values in the row, control is transferred to 1516.

At 1516, the row is generated based on any reconstructed column value(s) and any read non-large column value(s). The requested row is generated using any column value(s) that are reconstructed using any sets of large column value associating data that were stored in the row and any other non-large column values that were stored in the row.

At 1518, the row is returned.

Figure 16:
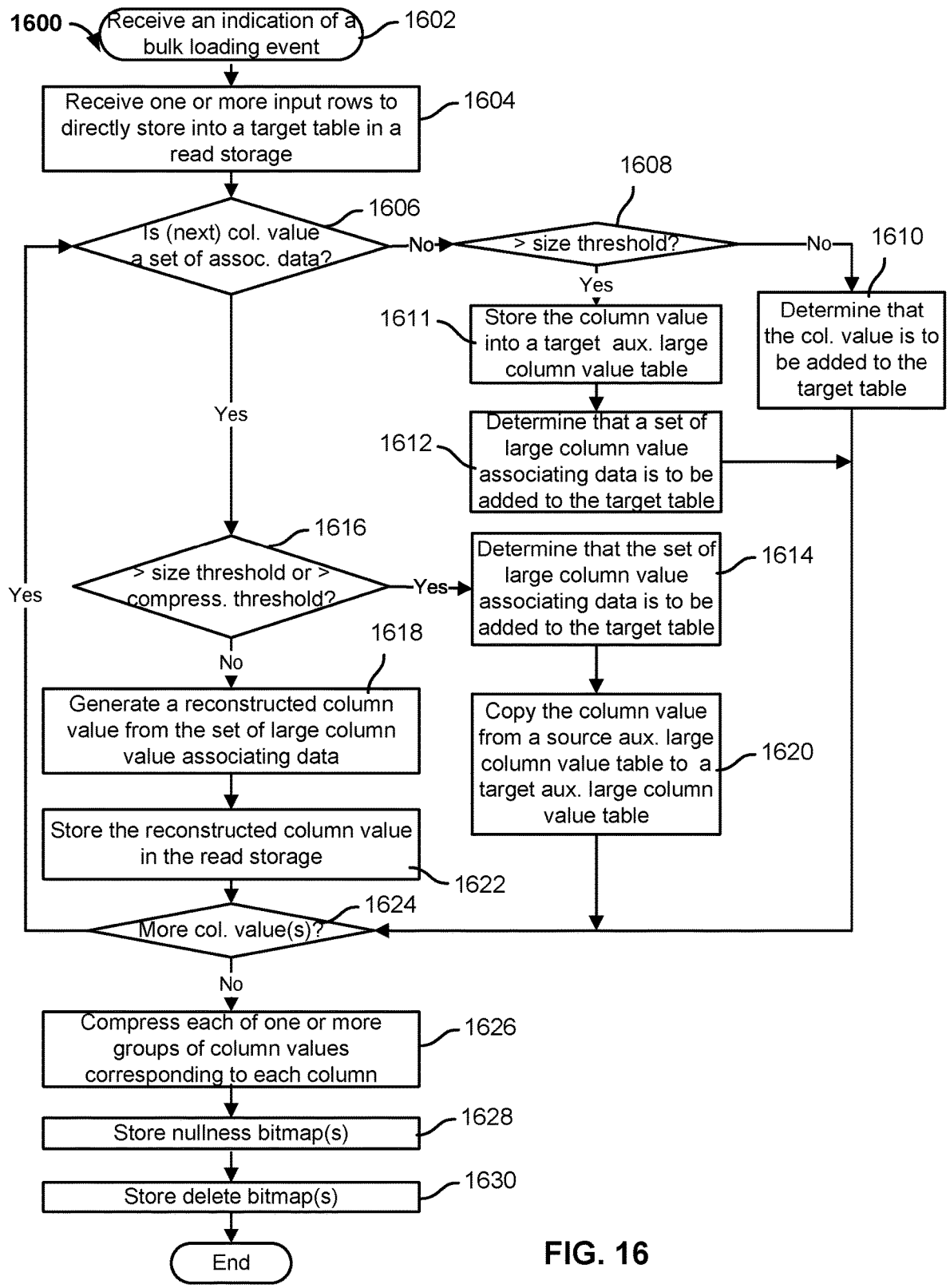
FIG. 16 is a flow diagram showing an example of a process for performing bulk loading in a database.

FIG. 16 is a flow diagram showing an example of a process for performing bulk loading in a database. In some embodiments, process 1600 is implemented at database system 100 of FIG. 1. In some embodiments, step 304 of process 300 of FIG. 3 may be implemented, at least in part, using process 1600.

Process 1600 is an example process that describes storing one or more input rows directly to a table in the read storage. Unlike merging (e.g., an example process is described in FIG. 8), in which rows of data inserted to a table are first stored in the write storage before eventually being merged into the read storage, process 1600 describes an example process of skipping the write storage and storing input row(s) of data to a target table directly in the read storage. For example, process 1600 may be used to store rows of data that are expected to be relatively static (i.e., unlikely to be updated because update requests are more cost effective when they are performed in write storage). For example, process 1600 may be used to store rows of data that are included in a file or rows of data from a different table in the database.

At 1602, an indication of a bulk loading event is received. In a first example, a bulk loading event is initialized by a user input of a file that includes input rows of data to be added to a target table in the read storage. In a second example, a bulk loading event is initialized by a user requesting to move rows of data from a source table to a target table in the read storage.

At 1604, one or more input rows to directly store into a target table in a read storage are received.

In some embodiments, a counter that tracks the accumulated size of columns in each column is generated and also initialized to zero. There is one such counter for each column. In some embodiments, another counter that tracks the number of the input row(s) that have been processed so far is generated and also initialized to zero. Then, in some embodiments, the input row(s) are processed one-by-one for merging. The counters are updated as rows are processed. In some embodiments where the read storage uses the row group variant of the column-oriented storage, column values of the selected row(s) that belong to the same column are grouped together. After each row group is merged, the counters are reset.

In some embodiments, whether the column value is NULL is first determined. If the column value is NULL, then the corresponding bit in its column's corresponding nullness bitmap is set to a nullness value (e.g., a bit value of 1). Otherwise, if the column value is not NULL, then the corresponding bit in its column's corresponding nullness bitmap is set to a non-nullness value (e.g., a bit value of 0).

At 1606, whether a (next) column value in the one or more input rows is a set of large column value associating data is determined. In the event that the column value is a set of large column value associating data, control is transferred to 1616. Otherwise, in the event that the column value is not a set of large column value associating data, control is transferred to 1608. In the event that the input row(s) are from a source table in the database, they may include set(s) of large column value associating data that point to large column value(s) that are stored at a corresponding source auxiliary large column value table (as described in the example of process 200 of FIG. 2, a corresponding auxiliary large column value table is generated for a corresponding table in the database).

At 1608, whether a size of the column value is greater than a large column value threshold size is determined. In the event that the column value size is greater than the large column value threshold size, control is transferred to 1611. Otherwise, in the event that the column value size is equal to or less than the large column value threshold, control is transferred to 1610. If the column value is not already a set of large column value associating data and the column value's size is greater than the configured large column value threshold size, then the column value is determined to be large with respect to the target table and is not to be directly stored in the target table.

At 1610, it is determined that the column value is to be added to the target table in the read storage. If the column value is not already a set of large column value associating data and the column value's size is not greater than the configured large column value threshold size, then the column value is not determined to be large with respect to the target table and is to be directly stored in the target table. In some embodiments, such a column value is therefore added to the corresponding column's grouped values.

At 1611, the column value is stored in a target auxiliary large column value table. In some embodiments, the column value is compressed and divided into chunks. Then, the chunks are stored into a target auxiliary large column value table corresponding to the target table. In some embodiments, if after the column value is compressed, its compressed size is not smaller or its compressibility ratio (e.g., the quotient of the original size of the column value divided by the compressed size) is not greater than a compressibility ratio threshold, the original, uncompressed column value is used to be stored into the target auxiliary large column value table.

At 1612, it is determined that a set of large column value associating data is to be added to the target table in the read storage. A newly generated set of large column value associating data that points to the chunks in the target auxiliary large column value table is to be added to the corresponding column's grouped values.

At 1616, whether the column value corresponding to the set of large column value associating data is greater than a large column value threshold size or has a compressibility ratio greater than a compressibility ratio threshold is determined. In the event that the column value size is greater than the large column value threshold size or has a compressibility ratio greater than a compressibility ratio threshold, control is transferred to 1614. Otherwise, in the event that the column value size is not greater than the large column value threshold size or does not have a compressibility ratio greater than a compressibility ratio threshold, control is transferred to 1618. For example, the compressibility ratio of the value can be determined by first extracting the original size and the compressed size of the value from the set of large column value associating data. Then the compressibility ratio is determined as the quotient of the original size divided by the compressed size. For example, a column value may already be a set of large column value associating data (e.g., based on its specified prefix) if the input rows are being moved over from a source table that uses a corresponding source auxiliary large column value table to store large column values.

At 1614, it is determined that a set of large column value associating data is to be added to the target table in the read storage. If the column value is already a set of large column value associating data and the column value's size is greater than the configured large column value threshold size or has a compressibility ratio greater than a compressibility ratio threshold, then the column value is determined to be large with respect to the target table and this set of large column value associating data is to be directly stored in the target table. The set of large column value associating data from the source table is to be added to the corresponding column's grouped values.

At 1620, the column value is copied from a source auxiliary large column value table to a target auxiliary large column value table. Chunk(s) of the large column value are copied from the source table's source auxiliary large column value table to the target table's target auxiliary large column value table.

At 1618, reconstructed column value is generated using the set of large column value associating data. If the column value is already a set of large column value associating data but the column value's size is not greater than the configured large column value threshold size or does not have a compressibility ratio greater than a compressibility ratio threshold, then the column value is not determined to be large with respect to the target table and this set of large column value associating data is not to be directly stored in the target table. In some embodiments, the set of large column value associating data is used to identify chunk(s) of the compressed column value from a source auxiliary large column value table corresponding to a source table from which the input row(s) are copied over. The identified chunks are used to form the compressed column value and the compressed column value is decompressed (e.g., using the decompression technique that is indicated in the set of large column value associating data) to reconstruct the original column value. For example, the chunks are reassembled in an order based on their respective chunkIndex. In some embodiments, the original size of the column value and the stored size of the column value are then extracted from the set of large column value associating data. If the two sizes are not equal, the assembled value is decompressed to finish reconstructing the original column value. But if the two sizes are equal, then the assembled value is the reconstructed original column value.

At 1622, the reconstructed column value is determined to be added to a corresponding column in the read storage. In some embodiments, the reconstructed column value is added to the corresponding column's grouped values.

At 1624, whether there are more column value(s) in the input row(s) is determined. In the event that there is at least one more column value in the input row(s), control is returned to 1606. Otherwise, in the event that there are no more column values in the input row(s), control is transferred to 1626.

In some embodiments where the read storage uses the row group variant of the column-oriented storage, after an input row is processed, it is determined whether any of the following conditions have been met: if the accumulated size of any of the individual columns' values exceeds a configured row group accumulated size threshold, if the number of rows processed so far exceeds a configured row group number threshold (e.g., the designated number of rows in each row group of the column-oriented storage), or if all the input rows have been processed. If none of the above three conditions have been met, the next input row is continued to be processed. Otherwise, the system declares the completion of the current row group. By limiting the total sizes of any individual column to be under a configured threshold, it is guaranteed that later when the column is decompressed, the memory space required to store the decompressed column values does not exceed the configured threshold. This effectively reduces the possibility of running out-of-memory (i.e., memory bloating).

At 1626, each of one or more groups of column values corresponding to each column is compressed. Column values belonging to each column in the target table are compressed to save on storage space in the read storage. As mentioned below, compressing values belonging to the same column may result in greater compression and space saving because values in the same column are of the same data type. In some embodiments where the read storage uses the row group variant of the column-oriented storage, each row group (a subset of rows) of each column is compressed. As mentioned above, compressing row groups may result in quicker processing of requests that query only portions of a column.

At 1628, nullness bitmap(s) are stored. One or more nullness bitmaps corresponding to the table are stored in the read storage. For example, each nullness bitmap corresponds to each row group of the table in the read storage.

At 1630, delete bitmap(s) are stored. One or more delete bitmaps corresponding to the table are stored in the read storage where all the bits are set to non-deleted values (e.g., bit values of zeroes). For example, each delete bitmap corresponds to each row group of the table in the read storage.

Figure 17:
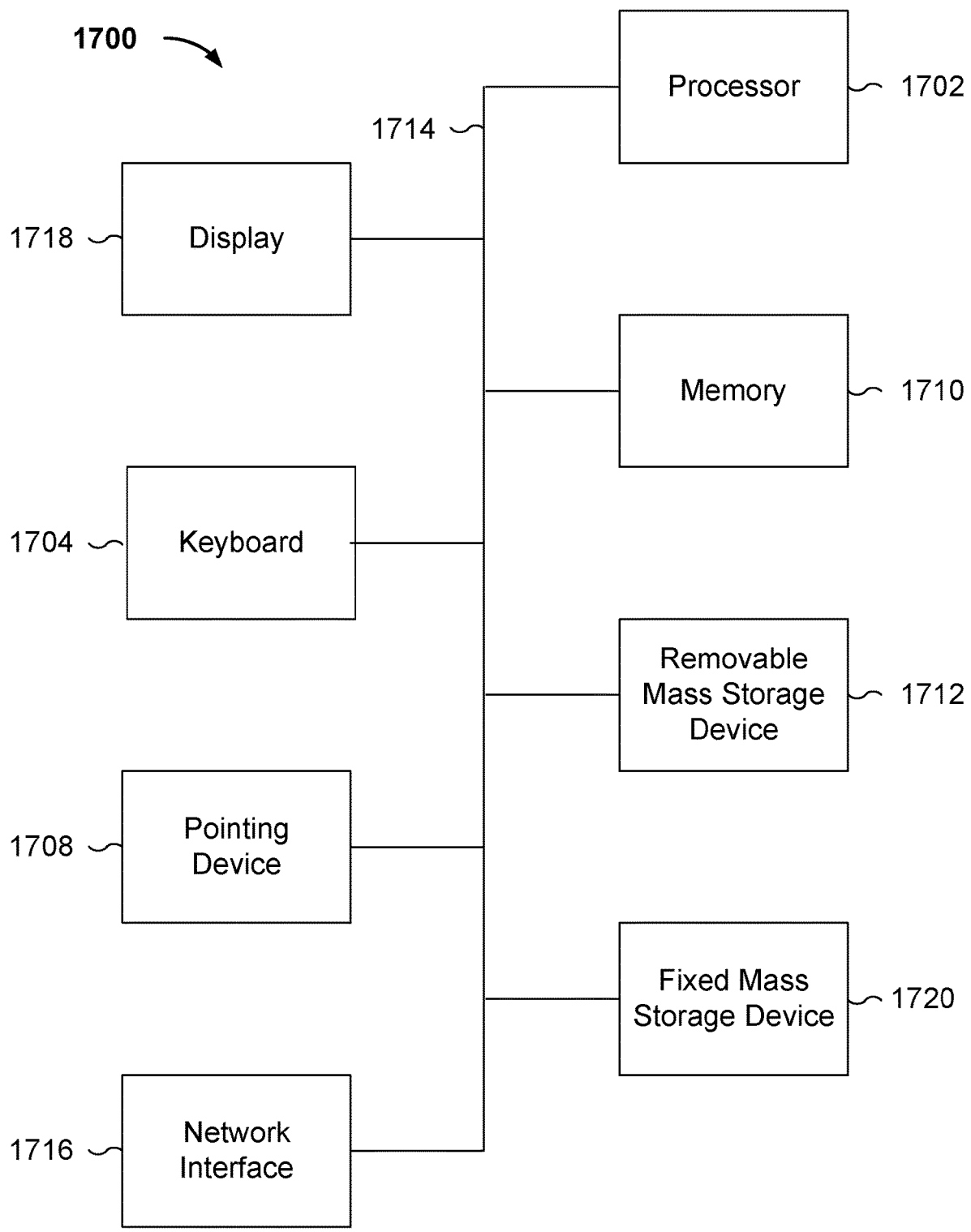
FIG. 17 is a functional diagram illustrating an embodiment of a database system for efficiently storing large column values in a columnar database.

FIG. 17 is a functional diagram illustrating an embodiment of a database system for efficiently storing large column values in a columnar database. As will be apparent, other computer system architectures and configurations can be used to efficiently store large column values in a columnar database. In some embodiments, database system 100 of FIG. 1 may be implemented using computer system 1700. Computer system 1700, which includes various subsystems as described below, includes at least one microprocessor subsystem (also referred to as a processor or a central processing unit (CPU)) 1702. For example, processor 1702 can be implemented by a single-chip processor or by multiple processors. In some embodiments, processor 1702 is a general purpose digital processor that controls the operation of the computer system 1700. Using instructions retrieved from memory 1710, the processor 1702 controls the reception and manipulation of input data, and the output and display of data on output devices (e.g., display 1718).

Processor 1702 is coupled bi-directionally with memory 1710, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1702. Also as is well known in the art, primary storage typically includes basic operating instructions, program code, data, and objects used by the processor 1702 to perform its functions (e.g., programmed instructions). For example, memory 1710 can include any suitable computer readable storage media, described below, depending on whether, for example, data access needs to be bi-directional or uni-directional. For example, processor 1702 can also directly and very rapidly retrieve and store frequently needed data in a cache memory (not shown).

A removable mass storage device 1712 provides additional data storage capacity for the computer system 1700 and is coupled either bi-directionally (read/write) or uni-directionally (read only) to processor 1702. For example, storage 1712 can also include computer readable media such as magnetic tape, flash memory, PC-CARDS, portable mass storage devices, holographic storage devices, and other storage devices. A fixed mass storage 1720 can also, for example, provide additional data storage capacity. The most common example of fixed mass storage 1720 is a hard disk drive. Mass storages 1712, 1720 generally store additional programming instructions, data, and the like that typically are not in active use by the processor 1702. It will be appreciated that the information retained within mass storages 1712 and 1720 can be incorporated, if needed, in standard fashion as part of memory 1710 (e.g., RAM) as virtual memory.

In addition to providing processor 1702 access to storage subsystems, bus 1714 can also be used to provide access to other subsystems and devices. As shown, these can include a display 1718, a network interface 1716, a keyboard 1704, and a pointing device 1708, as well as an auxiliary input/output device interface, a sound card, speakers, and other subsystems as needed. For example, the pointing device 1708 can be a mouse, stylus, track ball, or tablet, and is useful for interacting with a graphical user interface.

The network interface 1716 allows processor 1702 to be coupled to another computer, computer network, or telecommunications network using a network connection as shown. For example, through the network interface 1716, the processor 1702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1702 can be used to connect the computer system 1700 to an external network and transfer data according to standard protocols. For example, various process embodiments disclosed herein can be executed on processor 1702, or can be performed across a network such as the Internet, intranet networks, or local area networks, in conjunction with a remote processor that shares a portion of the processing. Additional mass storage devices (not shown) can also be connected to processor 1702 through network interface 1716.

An auxiliary I/O device interface (not shown) can be used in conjunction with computer system 1700. The auxiliary I/O device interface can include general and customized interfaces that allow the processor 1702 to send and, more typically, receive data from other devices such as microphones, touch-sensitive displays, transducer card readers, tape readers, voice or handwriting recognizers, biometrics readers, cameras, portable mass storage devices, and other computers.

For example, computer system 1700 may comprise a smart phone or a tablet computer. For example, memory 1710 is configured to store program instructions, and processor 1702, coupled to memory 1710, is configured to read the program instructions stored by memory 1710 and, in response, execute steps described in process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, process 1400 of FIG. 14, process 1500 of FIG. 15, and process 1600 of FIG. 16.

Various embodiments described herein enable efficient storage, management, and access of large column values in a columnar database system.

For each database table that uses column-oriented storage, an auxiliary table is used to store column values whose sizes exceed a configurable size threshold and/or are highly compressible by itself. In various embodiments, a unique identifier (e.g., ObjectID) for locating and accessing each stored large column value in this auxiliary table is stored in either the write storage or the read storage in corresponding set of large column value associating data.

An auxiliary large column value table corresponding to a database table can be shared between the table's data in both write storage and read storage. As data is merged from the write to the read storage or as rows of data are updated in the read storage, lightweight pointers (e.g., sets of large column value associating data) are passed between the two types of storages so that the data movement costs during the merge and update operations are minimized.

When data is added to the read storage, a set of rules is used to decide the best placement of large column values in the storage, e.g., whether the column values should be placed in the auxiliary table. The decision is based on the size of the column value and the compressibility of the data. The resulting placement avoids memory bloat and achieves a high compression ratio in data storage.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A system, comprising:
one or more processors configured to:
provide a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operate the database using the write storage, the read storage, and the auxiliary storage, wherein to operate the database using the write storage, the read storage, and the auxiliary storage includes to:
receive a read request to read the row;
locate the row in the write storage or the read storage;
determine that the row includes a set of large column value associating data;
use the set of large column value associating data to generate a reconstructed column value; and
generate the row based at least in part on the reconstructed column value; and one or more memories coupled to the one or more processors and configured to provide instructions to the one or more processors.

2. The system of claim 1, wherein the one or more processors are further configured to:
receive a create-table request to create a new table;
create the new table based at least in part on the create-table request; and
create the auxiliary storage corresponding to the new table.

3. The system of claim 1, wherein the one or more processors are further configured to:
receive a delete-table request to delete a table;
delete the table based at least in part on the delete-table request; and
delete the auxiliary storage corresponding to the table.

4. The system of claim 1, wherein the set of large column value associating data comprises a first set of large column value associating data, and wherein to operate the database using the write storage, the read storage, and the auxiliary storage further comprises to:
receive a request to insert a new row into a table;
determine that a new column value associated with the new row is large;
store the new column value in the auxiliary storage; and
store a second set of large column value associating data corresponding to the new column value in the write storage, wherein the second set of large column value associating data is usable to locate the new column value in the auxiliary storage.

5. The system of claim 4, wherein to determine that the new column value associated with the new row is large, includes to:
determine that a size associated with the new column value is greater than a large column value threshold size; and
determine that the new column value is associated with a compressibility ratio that is greater than a large column value compressibility ratio threshold.

6. The system of claim 1, wherein the set of large column value associating data comprises a first set of large column value associating data, and wherein to operate the database using the write storage, the read storage, and the auxiliary storage further includes to:
receive an indication of a merge event;
select one or more rows to merge from the write storage to the read storage;
determine that the one or more rows include a second set of large column value associating data;
determine that a selected column value associated with the second set of large column value associating data is large with respect to the read storage; and
determine that the second set of large column value associating data is to be added to the read storage.

7. The system of claim 1, wherein the set of large column value associating data comprises a first set of large column value associating data, wherein the reconstructed column value comprises a first reconstructed column value, and wherein to operate the database using the write storage, the read storage, and the auxiliary storage further includes to:
receive an indication of a merge event;
select one or more rows to merge from the write storage to the read storage;
determine that the one or more rows include a second set of large column value associating data;
determine that a selected column value associated with the second set of large column value associating data is not large with respect to the read storage;
generate a second reconstructed column value using the second set of large column value associating data; and
determine that the second reconstructed column value is to be added to a corresponding column in the read storage.

8. The system of claim 1, wherein the row comprises a first row, wherein the set of large column value associating data comprises a first set of large column value associating data, and wherein to operate the database using the write storage, the read storage, and the auxiliary storage further includes to:
receive a delete request to delete a second row;
determine that the second row is located in the write storage;
determine that the second row includes a second set of large column value associating data;
use the second set of large column value associating data to locate a corresponding column value in the auxiliary storage;
delete the corresponding column value from the auxiliary storage; and
delete the second row from the write storage.

9. The system of claim 1, wherein the row comprises a first row, wherein the set of large column value associating data comprises a first set of large column value associating data, and wherein to operate the database using the write storage, the read storage, and the auxiliary storage further includes to:
receive a delete request to delete a second row;
determine that the second row is located in the read storage;
determine that the second row includes a second set of large column value associating data;
set a corresponding flag in a delete bitmap corresponding to the second row;
use the second set of large column value associating data to locate a corresponding column value in the auxiliary storage; and
delete the corresponding column value from the auxiliary storage.

10. The system of claim 1, wherein the row comprises a first row, and wherein to operate the database using the write storage, the read storage, and the auxiliary storage further includes to:
receive an update request to update a second row;
determine that the second row is located in the write storage;
determine that the update request includes a selected column value;
determine that the selected column value is large;
store the selected column value in the auxiliary storage;
generate a new set of large column value associating data corresponding to the selected column value; and
store a new row in the write storage using at least any existing column value(s) of the row, the new set of large column value associating data, and any existing set(s) of large column value associating data of the row.

11. The system of claim 1, wherein the row comprises a first row, wherein the set of large column value associating data comprises a first set of large column value associating data, and wherein to operate the database using the write storage, the read storage, and the auxiliary storage further includes to:
receive an update request to update a second row;

determine that the second row is located in the read storage;
determine that the update request includes a selected column value;
determine that the selected column value is large;
store the selected column value in the auxiliary storage;
generate a new set of large column value associating data corresponding to the selected column value;
store a new row in the write storage using at least any existing column value(s) of the row, the new set of large column value associating data, and any existing set(s) of large column value associating data of the second row; and
set a corresponding flag in a delete bitmap corresponding to the second row.

12. The system of claim 1, wherein the column value comprises a first column value, wherein the set of large column value associating data comprises a first set of large column value associating data, and wherein to operate the database using the write storage, the read storage, and the auxiliary storage, wherein the auxiliary storage comprises a target auxiliary storage, further includes to:
receive an indication of a bulk loading event;
receive one or more input rows to store in the read storage;
determine that the one or more input rows includes a second set of large column value associating data;
determine that a second column value associated with the second set of large column value associating data is greater than a large column value threshold size or the second column value has a compressibility ratio that is greater than a compressibility ratio threshold;
determine that the second set of large column value associating data is to be copied into the read storage; and
copy the second column value associated with the second set of large column value associating data from a source auxiliary storage to the target auxiliary storage.

13. A method, comprising:
providing a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operating the database using the write storage, the read storage, and the auxiliary storage wherein operating the database using the write storage, the read storage, and the auxiliary storage includes:
receiving a read request to read the row;
locating the row in the write storage or the read storage;
determining that the row includes a set of large column value associating data;
using the set of large column value associating data to generate a reconstructed column value; and
generating the row based at least in part on the reconstructed column value.

14. The method of claim 13, wherein the set of large column value associating data comprises a first set of large column value associating data, and wherein operating the database using the write storage, the read storage, and the auxiliary storage further comprises:
receiving a request to insert a new row into a table;
determining that a new column value associated with the new row is large;
storing the new column value in the auxiliary storage; and
storing a second set of large column value associating data corresponding to the new column value in the write storage, wherein the second set of large column value associating data is usable to locate the new column value in the auxiliary storage.

15. The method of claim 14, wherein determining that the column value associated with the new row is large, includes:
determining that a size associated with the new column value is greater than a large column value threshold size; and
determining that the new column value is associated with a compressibility ratio that is greater than a large column value compressibility ratio threshold.

16. The method of claim 13, wherein the set of large column value associating data comprises a first set of large column value associating data, and wherein operating the database using the write storage, the read storage, and the auxiliary storage further includes:
receiving an indication of a merge event;
selecting one or more rows to merge from the write storage to the read storage;
determining that the one or more rows include a second set of large column value associating data;
determining that a selected column value associated with the second set of large column value associating data is large with respect to the read storage; and
determining that the second set of large column value associating data is to be added to the read storage.

17. The method of claim 13, wherein the row comprises a first row, wherein the set of large column value associating data comprises a first set of large column value associating data, and wherein operating the database using the write storage, the read storage, and the auxiliary storage further includes:
receiving an update request to update a second row;
determining that the second row is located in the read storage;
determining that the update request includes a selected column value;
determining that the selected column value is large;
storing the selected column value in the auxiliary storage;
generating a new set of large column value associating data corresponding to the selected column value;
storing a new row in the write storage using at least any existing column value(s) of the row, the new set of large column value associating data, and any existing set(s) of large column value associating data of the second row; and
setting a corresponding flag in a delete bitmap corresponding to the second row.

18. A computer program product, the computer program product being embodied in a non-transitory computer readable storage medium and comprising computer instructions for:
providing a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operating the database using the write storage, the read storage, and the auxiliary storage, wherein operating the database using the write storage, the read storage, and the auxiliary storage includes:
receiving a read request to read the row;
locating the row in the write storage or the read storage;

determining that the row includes a set of large column value associating data;
using the set of large column value associating data to generate a reconstructed column value; and
generating the row based at least in part on the reconstructed column value.

19. A system, comprising:
one or more processors configured to:
provide a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operate the database using the write storage, the read storage, and the auxiliary storage, wherein to operate the database using the write storage, the read storage, and the auxiliary storage includes to:
receive an indication of a merge event;
select one or more rows to merge from the write storage to the read storage;
determine that the one or more rows include a set of large column value associating data;
determine that a selected column value associated with the set of large column value associating data is large with respect to the read storage; and
determine that the set of large column value associating data is to be added to the read storage; and
one or more memories coupled to the one or more processors and configured to provide instructions to the one or more processors.

20. A system, comprising:
one or more processors configured to:
provide a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operate the database using the write storage, the read storage, and the auxiliary storage, wherein to operate the database using the write storage, the read storage, and the auxiliary storage includes to:
receive an indication of a merge event;
select one or more rows to merge from the write storage to the read storage;
determine that the one or more rows include a set of large column value associating data;
determine that a selected column value associated with the set of large column value associating data is not large with respect to the read storage;
generate a reconstructed column value using the set of large column value associating data; and
determine that the reconstructed column value is to be added to a corresponding column in the read storage; and
one or more memories coupled to the one or more processors and configured to provide instructions to the one or more processors.

21. A system, comprising:
one or more processors configured to:
provide a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operate the database using the write storage, the read storage, and the auxiliary storage, wherein to operate the database using the write storage, the read storage, and the auxiliary storage includes to:
receive a delete request to delete the row;
determine that the row is located in the write storage;
determine that the row includes a set of large column value associating data;
use the set of large column value associating data to locate a corresponding column value in the auxiliary storage;
delete the corresponding column value from the auxiliary storage; and
delete the row from the write storage; and
one or more memories coupled to the one or more processors and configured to provide instructions to the one or more processors.

22. A system, comprising:
one or more processors configured to:
provide a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operate the database using the write storage, the read storage, and the auxiliary storage, wherein to operate the database using the write storage, the read storage, and the auxiliary storage includes to:
receive a delete request to delete the row;
determine that the row is located in the read storage;
determine that the row includes a set of large column value associating data;
set a corresponding flag in a delete bitmap corresponding to the row;
use the set of large column value associating data to locate a corresponding column value in the auxiliary storage; and
delete the corresponding column value from the auxiliary storage; and
one or more memories coupled to the one or more processors and configured to provide instructions to the one or more processors.

23. A system, comprising:
one or more processors configured to:
provide a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and
operate the database using the write storage, the read storage, and the auxiliary storage, wherein to operate the database using the write storage, the read storage, and the auxiliary storage includes to:
receive an update request to update the row;
determine that the row is located in the write storage;
determine that the update request includes a selected column value;
determine that the selected column value is large;
store the selected column value in the auxiliary storage;

generate a new set of large column value associating data corresponding to the selected column value; and store a new row in the write storage using at least any existing column value(s) of the row, the new set of large column value associating data, and any existing set(s) of large column value associating data of the row; and one or more memories coupled to the one or more processors and configured to provide instructions to the one or more processors.

24. A system, comprising:

one or more processors configured to:

provide a database comprising a write storage, a read storage, and an auxiliary storage, and wherein the auxiliary storage is used to store a large column value of a row that is associated with either the write storage or the read storage, wherein the large column value comprises a column value that meets a set of large column value criteria; and operate the database using the write storage, the read storage, and the auxiliary storage, wherein to operate the database using the write storage, the read storage, and the auxiliary storage includes to:

receive an update request to update the row;

determine that the row is located in the read storage;

determine that the update request includes a selected column value;

determine that the selected column value is large;

store the selected column value in the auxiliary storage;

generate a new set of large column value associating data corresponding to the selected column value;

store a new row in the write storage using at least any existing column value(s) of the row, the new set of large column value associating data, and any existing set(s) of large column value associating data of the row; and set a corresponding flag in a delete bitmap corresponding to the row; and one or more memories coupled to the one or more processors and configured to provide instructions to the one or more processors.

* * * * *

UNITED STATES PATENT AND TRADEMARK OFFICE
CERTIFICATE OF CORRECTION

| | |
|---|---|
| PATENT NO. | : 11,308,054 B2 |
| APPLICATION NO. | : 16/742735 |
| DATED | : April 19, 2022 |
| INVENTOR(S) | : Fang Zheng et al. |

It is certified that error appears in the above-identified patent and that said Letters Patent is hereby corrected as shown below:

On the Title Page

Item (73), assignee, address, after "Alibaba Group Holding Limited", insert --, George Town (KY)--, therefor.

Signed and Sealed this
Thirty-first Day of January, 2023

*Katherine Kelly Vidal*

Katherine Kelly Vidal
*Director of the United States Patent and Trademark Office*